United States Patent
Onaizi et al.

(10) Patent No.: US 12,172,126 B1
(45) Date of Patent: Dec. 24, 2024

(54) PROCESS FOR REMOVING HYDROGEN SULFIDE FROM SOUR GASES WITH LAYERED TRIPLE HYDROXIDES/OXIDES

(71) Applicant: KING FAHD UNIVERSITY OF PETROLEUM AND MINERALS, Dhahran (SA)

(72) Inventors: Sagheer A. Onaizi, Dhahran (SA); Mustapha Iddrisu, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 18/772,831

(22) Filed: Jul. 15, 2024

(51) Int. Cl.
 *B01D 53/52* (2006.01)
 *B01D 53/80* (2006.01)

(52) U.S. Cl.
 CPC ............ *B01D 53/52* (2013.01); *B01D 53/80* (2013.01); *B01D 2253/1124* (2013.01); *B01D 2257/304* (2013.01)

(58) Field of Classification Search
 CPC .................... B01D 53/52; B01D 53/80; B01D 2253/1124; B01D 2257/304
 USPC ....................................................... 423/225
 See application file for complete search history.

(56) References Cited

U.S. PATENT DOCUMENTS

| | | |
|---|---|---|
| 2005/0109210 A1 | 5/2005 | Davis et al. |
| 2018/0072936 A1* | 3/2018 | Sehsah .................... E21B 41/02 |
| 2024/0082509 A1 | 3/2024 | Onaizi |
| 2024/0082809 A1* | 3/2024 | Onaizi ................. B01J 20/3078 |
| 2024/0093107 A1* | 3/2024 | Onaizi ..................... B01J 20/08 |
| 2024/0191126 A1* | 6/2024 | Oduro ...................... C09K 8/48 |

FOREIGN PATENT DOCUMENTS

| | | |
|---|---|---|
| CN | 115888670 A | 4/2023 |
| JP | 2005283596 A | 9/2005 |

OTHER PUBLICATIONS

Hui-bin Fang, et al., "Selective oxidation of hydrogen sulfide to sulfur over activated carbon-supported metal oxides", Fuel, vol. 108, Jun. 2013, pp. 143-148.

Nivedhini Iswarya Chandrasekaran, et al., "Mesoporous hollow Mn—Cu—Al layered triple hydroxides nanocomposite synthesized via microwave assisted technique for symmetrical supercapacitor", International Journal of Hydrogen Energy, vol. 42, Issue 42, Oct. 19, 2017, pp. 26475-26487.

* cited by examiner

*Primary Examiner* — Anita Nassiri-Motlagh
(74) *Attorney, Agent, or Firm* — Oblon, McClelland, Maier & Neustadt, L.L.P.

(57) ABSTRACT

A method for removing hydrogen sulfide ($H_2S$) from a $H_2S$-containing gas composition, including dispersing particles of a mud composition in a reactor, introducing the $H_2S$-containing gas composition through a bottom of the reactor containing the mud composition and passing the $H_2S$-containing gas composition through the mud composition, and adsorbing and removing $H_2S$ from the gas composition by the mud composition to form a purified gas composition. The mud composition contains a CuMnAl layered triple oxide (LTO) and a base mud.

20 Claims, 12 Drawing Sheets

PROCESS FOR REMOVING HYDROGEN SULFIDE FROM SOUR GASES WITH LAYERED TRIPLE HYDROXIDES/OXIDES

STATEMENT OF ACKNOWLEDGEMENT

Support provided by the King Fahd University of Petroleum and Minerals (KFUPM) is gratefully acknowledged.

BACKGROUND

Technical Field

The present disclosure is directed to a process for removing hydrogen sulfide ($H_2S$) from a $H_2S$-containing fluid, and particularly, to the process for removing $H_2S$ from a gaseous composition with a layered triple hydroxide or a layered triple oxide in a drilling mud.

Description of Related Art

The "background" description provided herein is to generally present the context of the disclosure. Work of the presently named inventors, to the extent it is described in this background section, as well as aspects of the description that may not otherwise qualify as prior art at the time of filing, are neither expressly nor impliedly admitted as prior art against the present invention.

Hydrogen sulfide is a colorless, odiferous, and highly toxic gas that can cause possible life-threatening situations at a concentration as low as 350 ppm for a short-term exposure. In addition to its toxicity, health and safety issues, this colorless gas is also highly corrosive and hence it is desirable and often necessary to remove hydrogen sulfide from a hydrogen sulfide containing stream, such as sour natural gas, biogas, and sour gases.

Accordingly, the maximum concentration of $H_2S$ in marketable natural gas is 4 ppmv at standard temperature and pressure, which is considered to be the threshold value above which the natural gas needs to be sweetened in order to reduce the $H_2S$ concentration. Localized corrosion and stress cracking is common in pipes/units handling $H_2S$-containing streams. It has been reported that the presence of $H_2S$ even at low concentrations can cause a substantial adverse impact on carbon steel. Therefore, $H_2S$ must be effectively scavenged from sour gases to not only mitigate its safety and operational issues but also reduce its damage to the pipelines, valves and surfaces of process equipment.

Technologies and approaches to these problems have been developed industrially for sweetening (e.g., removing $H_2S$) hydrocarbons and natural gas. These technologies mainly involve the use of amine-based solutions, carbonaceous materials, or metal salts as adsorbents of $H_2S$, or as oxidizers for converting $H_2S$ to more harmless element sulfur. Practical approaches often involve (i) complicated homogenous systems, (ii) sophisticated chemical agents, e.g., highly functionalized chelating agents, flammable oxidizing agents and costly stabilizers, and (iii) restricted application conditions, e.g., limited pH ranges, particular temperature ranges, and certain pressure requirements. Hence, there is a need for improved desulfurization and/or sweetening techniques, and apparatuses and protocols for such treatment.

In view of the forgoing, one objective of the present disclosure is to provide a process for removing $H_2S$ from a $H_2S$-containing gas composition. A further objective of the present disclosure is to provide a layered triple hydroxide or a layered triple oxide and the application in a bubble reactor process for the desulfurization of sour gases and liquid hydrocarbon fuels.

SUMMARY

In an exemplary embodiment, a process for removing hydrogen sulfide ($H_2S$) from a $H_2S$-containing gas composition, including dispersing particles of a mud composition in a reactor, introducing the $H_2S$-containing gas composition through a bottom of the reactor containing the mud composition and passing the $H_2S$-containing gas composition through the mud composition, and adsorbing and removing $H_2S$ from the gas composition by the mud composition to form a purified gas composition. The mud composition contains a CuMnAl layered triple oxide (LTO) and a base mud.

In some embodiments, the CuMnAl LTO has a molar ratio of Cu to Mn to Al of 1-10 to 1-10 to 1-10.

In some embodiments, the mud composition contains 0.1-5 wt. % of the CuMnAl LTO, based on a total weight of the mud composition.

In some embodiments, the base mud contains water, bentonite, xanthan gum, starch, potassium hydroxide, and calcium carbonate.

In some embodiments, the base mud contains 40-80 g bentonite, 0.1-1 g xanthan gum, 10-30 g starch, 1-5 g potassium hydroxide, and 50-100 g calcium carbonate, per liter of the water. In some embodiments, the mud composition has an apparent viscosity within 5% of the base mud alone.

In some embodiments, the gas composition further contains at least one of methane, carbon dioxide, and nitrogen, and the mud composition selectively adsorbs the $H_2S$.

In some embodiments, the $H_2S$ is present in the gas composition at a concentration in a range of 10 to 200 parts per million by volume (ppmv) based on a total volume of the gas composition.

In some embodiments, the $H_2S$-containing gas composition is introduced to the reactor at a rate of 0.4 to 2.0 milliliters per minute (mL/min) per milligram of the CuMnAl LTO.

In some embodiments, the mud composition contains 1.0 wt. % of the CuMnAl LTO, based on a total weight of the mud composition, the mud composition is in contact with the gas composition containing 100 ppmv of $H_2S$ at a rate of 100 mL/min in the reactor, the mud composition has a breakthrough time of from 15-20 hours, and a saturation time of from 45-50 hours, and the mud composition has a scavenging capacity of 140-250 mg of hydrogen sulfide per gram of CuMnAl LTO in the reactor.

In another exemplary embodiment, a process for removing hydrogen sulfide ($H_2S$) from a $H_2S$-containing gas composition, including dispersing particles of a mud composition in a reactor, introducing the $H_2S$-containing gas composition through a bottom of the reactor containing the mud composition and passing the $H_2S$-containing gas composition through the mud composition, and adsorbing and removing $H_2S$ from the gas composition by the mud composition to form a purified gas composition. The mud composition contains a CuMnFe layered triple hydroxide (LTH) and a base mud.

In some embodiments, the CuMnFe LTH has a molar ratio of Cu to Mn to Fe of 1-10 to 1-10 to 1-10.

In some embodiments, the mud composition contains 0.1-5 wt. % of the CuMnFe LTH, based on a total weight of the mud composition.

In some embodiments, the base mud contains water, bentonite, xanthan gum, starch, potassium hydroxide, and calcium carbonate.

In some embodiments, the base mud contains 40-80 g bentonite, 0.1-1 g xanthan gum, 10-30 g starch, 1-5 g potassium hydroxide, and 50-100 g calcium carbonate, per liter of the water.

In some embodiments, the mud composition has an apparent viscosity within 5% of the base mud alone.

In some embodiments, the gas composition further contains at least one of methane, carbon dioxide, and nitrogen, and the mud composition selectively adsorbs the $H_2S$.

In some embodiments, the $H_2S$ is present in the gas composition at a concentration in a range of 10 to 200 parts per million by volume (ppmv) based on a total volume of the gas composition.

In some embodiments, the $H_2S$-containing gas composition is introduced to the reactor at a rate of 0.1 to 2.0 milliliters per minute (mL/min) per milligram of the CuMnFe LTH.

In some embodiments, the mud composition contains 0.25 wt. % of the CuMnFe LTH, based on a total weight of the mud composition, the mud composition is in contact with the gas composition comprising 100 ppmv of $H_2S$ at a rate of 100 mL/min in the reactor, the mud composition has a breakthrough time of from 3-5 hours, and a saturation time of from 12-18 hours, and the mud composition has a scavenging capacity of 140-350 mg of hydrogen sulfide per gram of CuMnFe LTH in the reactor.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
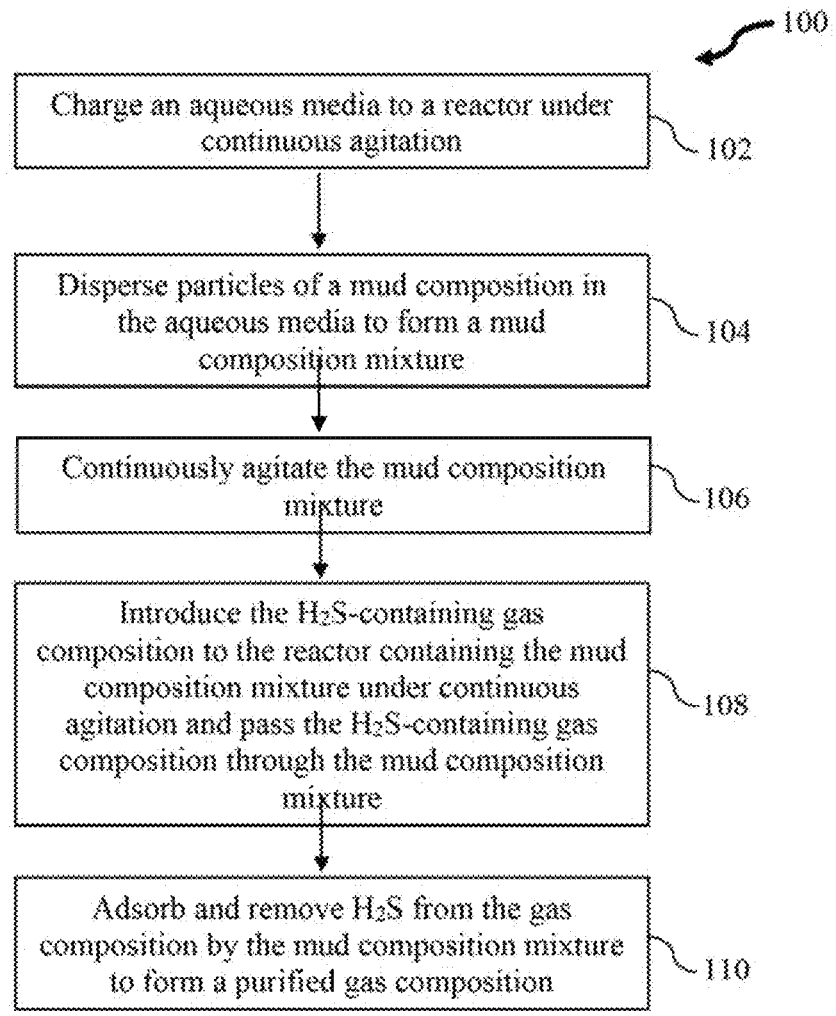
FIG. 1 is a schematic flow diagram of a process for removing hydrogen sulfide ($H_2S$) from a $H_2S$-containing gas composition, according to certain embodiments.

In the following description, it is understood that other embodiments may be utilized, and structural and operational changes may be made without departure from the scope of the present embodiments disclosed herein.

Embodiments of the present disclosure will now be described more fully hereinafter with reference to the accompanying drawings, in which some, but not all embodiments of the disclosure are shown. In the drawings, like reference numerals designate identical or corresponding parts throughout the several views.

Furthermore, the terms "approximately," "approximate," "about," and similar terms generally refer to ranges that include the identified value within a margin of 20%, 10%, or preferably 5%, and any values there between.

As used herein, the words "a" and "an" and the like carry the meaning of "one or more". Within the description of this disclosure, where a numerical limit or range is stated, the endpoints are included unless stated otherwise. Also, all values and subranges within a numerical limit or range are specifically included as if explicitly written out.

As used herein, the terms "optional" or "optionally" means that the subsequently described event(s) can or cannot occur or the subsequently described component(s) may or may not be present (e.g., 0 wt. %).

As used herein, the term "fluid" refers to a gas, a liquid, a mixture of gas and liquid, or a gas or liquid comprising dispersed solids, droplets and/or bubbles. The droplets and/or bubbles may be irregular or regular and may be similar or different in size.

As used herein, the term "stirred tank reactor," "continuous stirred tank reactor," "mixed flow reactor," "continuous flow stirred tank reactor," and similar terms generally refer to a model for a chemical reactor in chemical engineering. The stirred tank reactor may have a liquid height and a rotating shaft containing a plurality of agitator blades.

As used herein, the term "quenching" refers to the rapid reduction of the temperature of the reaction mixture, the rapid introduction of a reactant or non-reactant fluid into the reaction mixture, or the reaction through a restricted opening or passage having dimensions below the quench diameter. In accordance with the present invention disclosure, the term "quenching" also refers to the process of terminating a chemical reaction with an associated reduction of temperature.

As used herein, the term "hydrocarbon" refers to hydrocarbon compounds, i.e., aliphatic compounds (e.g., alkanes, alkenes or alkynes), alicyclic compounds (e.g., cycloalkanes, cycloalkylenes), aromatic compounds, aliphatic and alicyclic substituted. It may refer to aromatic compounds, aromatic substituted aliphatic compounds, aromatic substituted alicyclic compounds and similar compounds. The term "hydrocarbon" may also refer to a substituted hydrocarbon compound, e.g., a hydrocarbon compound containing non-hydrocarbon substituents. Examples of non-hydrocarbon substituents may include hydroxyl, acyl, nitro and the like. The term "hydrocarbon" may as well refer to a hetero-substituted hydrocarbon compound, i.e., a hydrocarbon compound which comprises an atom other than carbon in the chain or ring and the other part comprises a carbon atom. Heteroatoms may include, for example, nitrogen, oxygen, sulfur and similar elements.

The present disclosure describes a process for $H_2S$ scavenging from sour gases and liquids to meet the growing needs of desulfurization on an industrial scale. The process optionally involves making and using a mud composition to react with the $H_2S$ in a heterogeneous mixture. The effectiveness of the said process and mud composition was assessed by injecting a sour natural gas into a bubble column reactor containing the mud composition. The gas leaving the reactor was continuously monitored and the concentration of $H_2S$ in the sweetened gas was continuously measured, enabling the construction of $H_2S$ breakthrough curves and the calculation of the amount of $H_2S$ scavenged. In general, two types of mud compositions were studied a first mud composition including a layered hydroxide and a second mud composition including a layered oxide. The first and second mud compositions are referred to generically as the mud composition unless where distinctions are made.

According to a first aspect, the present disclosure relates to a process for removing hydrogen sulfide ($H_2S$) from a $H_2S$-containing gas composition. The process for removing $H_2S$ from a $H_2S$-containing gas composition involves (i) charging an aqueous media to a reactor optionally under continuous agitation, (ii) dispersing particles of a mud composition in the aqueous media to form a mud composition mixture, (iii) continuously agitating the mud composition mixture, (iv) introducing the $H_2S$-containing gas composition to the reactor containing the mud composition mixture under continuous agitation and passing the $H_2S$-containing gas composition through the mud composition mixture, and (v) adsorbing the $H_2S$ from the $H_2S$-containing gas composition onto the mud composition to remove the $H_2S$ from the $H_2S$-containing gas composition and form a purified gas composition.

Referring to FIG. 1, a schematic flow diagram of a process for removing $H_2S$ from a $H_2S$-containing gas composition is illustrated. The order in which the method 100 is described is not intended to be construed as a limitation, and any number of the described method steps may be combined in any order to implement the method 100. Additionally, individual steps may be removed or skipped from the method 100 without departing from the spirit and scope of the present disclosure.

At step 102, the method 100 includes charging a liquid to a reactor under continuous agitation. In one exemplary embodiment, the liquid includes an aqueous media, an oil, an oil-in-water emulsion, and/or a water-in-oil emulsion. In one embodiment, the liquid is a sour oil. In a preferred embodiment, the liquid is a sour water. In a more preferred embodiment, the liquid is selected from the group consisting of tap water, ground water, distilled water, deionized water, saltwater, hard water, fresh water, and wastewater. For purposes of this description, the term "saltwater" may include saltwater with a chloride ion content of between about 6000 ppm and saturation, and is intended to encompass seawater and other types of saltwater including groundwater containing additional impurities typically found therein such as brackish water. The term "hard water" may include water having mineral concentrations between about 2000 mg/L and about 300,000 mg/L. The term "fresh water" may include water sources that contain less than 6000 ppm, preferably less than 5000 ppm, preferably less than 4000 ppm, preferably less than 3000 ppm, preferably less than 2000 ppm, preferably less than 1000 ppm, preferably less than 500 ppm of salts, minerals, or any other dissolved solids. Salts that may be present in tap water, ground water, saltwater, wastewater, hard water, and/or fresh water may be, but are not limited to, cations such as sodium, magnesium, calcium, potassium, ammonium, and iron, and anions such as chloride, bicarbonate, carbonate, sulfate, sulfite, phosphate, iodide, nitrate, acetate, citrate, fluoride, and nitrite.

In some embodiments, the liquid may further contain ethylene glycol, methanol, ethanol, propanol, isopropanol, n-butanol, ethyl acetate, pet ether, pentane, hexane(s), decalin, THF, dioxane, toluene, xylene(s), and/or o-dichlorobenzene. In some more other embodiments, the liquid may contain a minority fraction of, or even no, water.

In some preferred embodiments, the liquid comprises at least 50, 60, 70, 75, 80, 85, 90, 95, 96, 97, 97.5, 98, 99, 99.1, 99.5, or 99.9 wt. % $H_2O$, based upon a total weight of the liquid.

In a further exemplary embodiment, the reactor is at least one reactor selected from the group consisting of a stirred tank reactor, a packed bed reactor, a slurry reactor, and a bubble column reactor. In some embodiments, the reactor is a stirred tank reactor. In some embodiments, the reactor may not require stirring or agitation at all, or may be carried out with shearing or agitation no more than 20000, 10000, 5000, 2500, 1000, 500, 400, 300, 200, 100, 50, 25, or 10 Hz, and no less than 5, 10, 25, 50, 100, 200, 300, 400, 500, 1000, 2500, 5000, 10000, or 15000 Hz at a temperature in a range of 5 to 50° C., 10 to 45° C., preferably 15 to 40° C., further preferably 20 to 35° C., and more preferably 25 to 30° C. In some embodiments, the liquid occupies at least $\frac{1}{20}$, $\frac{1}{10}$, $\frac{3}{10}$, $\frac{1}{2}$, $\frac{2}{3}$, $\frac{4}{5}$, or $\frac{9}{10}$ of the reactor volume. In some embodiments, the liquid occupies no more than $\frac{10}{11}$, $\frac{9}{10}$, $\frac{4}{5}$, $\frac{2}{3}$, $\frac{1}{2}$, $\frac{3}{10}$, or $\frac{1}{10}$ of the reactor volume. In some embodiments, means of stirring or agitation may include magnetic stirring via magnetic spin bar, impellers, and/or ultrasonic waves. In certain embodiments, stirring or agitation may speed up the removal of $H_2S$.

In some embodiments, the reactor may be a vertical cylindrical reactor. In some embodiments, the reactor has a plurality of inlets and outlets for fluids at the bottom of the reactor. In some further embodiments, the reactor has a plurality of inlets and outlets for fluids at the top of the reactor. In a preferred embodiment the reactor has a plurality of inlets and outlets for liquid-suspended solids at the bottom of the reactor. In some further preferred embodiments, the reactor has a plurality of inlets for solids at the top of the reactor.

In order to ensure that the solid and suspended materials in the mud composition mixture remain in suspension it is preferred that a series of recirculation tubes fluidly connect a lower portion of the vertical cylindrical reactor (preferably a bottom portion) with an upper portion or body portion of the vertical cylindrical reactor that contains the mud composition mixture and/or liquid materials present in the reactor. The recirculation tubes may fluidly connect to a conical bottom portion of the vertical cylindrical reactor representing the bottommost portion thereof. A plurality of recirculation routes is preferable. One or more pumping mechanisms functions to draw the mud composition mixture from the bottom portion of the vertical cylindrical reactor and reintroduce the mud composition mixture in suspended form at an upper portion of the body portion of the vertical cylindrical reactor, preferably at a point that is below the uppermost liquid line present inside the vertical cylindrical reactor. During operation one or more recirculation pumps having an upstream connection to an outlet at the bottom of the vertical cylindrical reactor and a downstream connection to the body portion of the vertical cylindrical reactor functions to keep the suspended materials in a suspended state thereby eliminating formation of a hardened plug of solid material at the bottom of the vertical cylindrical reactor. Preferably there are at least four recirculation tubes, one for each of four quadrants defining the cross-section of the vertical cylindrical reactor. The inlet points in the body portion of the vertical cylindrical reactor at which the mud composition mixture is returned to the vertical cylindrical reactor are preferably at a height of less than one half the total height of the body portion of the vertical cylindrical reactor preferably at a height of 0.3-0.45 of the total height of the body portion of the vertical cylindrical reactor, e.g., measured from the bottommost portion of the cylindrical shape to the topmost portion of the cylindrical shape not including and cone or extender. During operation both mechanical agitation by a propeller and mechanical agitation by the recirculation tubes may occur such that the solids materials inside mud composition mixture remain fully suspended without settling.

In some embodiments, the particles of the mud composition in the liquid may react with the $H_2S$ in the $H_2S$-containing gas composition optionally in the presence of a support to form a metal sulfide and a purified gas composition. In one embodiment, the $H_2S$-containing gas composition is sour gas. In another embodiment, the reactor may include a closed top. In a further embodiment, the sour gas is introduced to the reactor through a gas distributor located at a lower portion of a body portion of the reactor. In some embodiments, the particles of the mud composition are suspended in the liquid. In some further embodiments, the mud composition particles are retained in the liquid phase by a particle trap located at an upper portion of the body portion of the reactor. In another embodiment, the purified gas composition may be accumulated in an upper region of a reactor. In yet another embodiment, the accumulated purified gas composition may be vented from the reactor through the outlets at the top of the reactor to the gas analyzer. In a preferred embodiment, the metal sulfide may be accumulated and settled in the liquid to the lower portion of the body portion of the reactor. In a further preferred embodiment, the metal sulfide accumulated may be removed from the liquid through the outlets at the bottom of the reactor.

In some embodiments, the $H_2S$-containing gas composition may be passed into the mud composition mixture by a gas distributor within the body of the mud composition mixture to distribute the gas composition in the form of small bubbles adjacent to a lower end of the reactor. The procedure may be operated as a continuous process or in intermittent manner and is particularly useful for scavenging operations. In some further embodiments, the $H_2S$-containing gas composition may be heated to a suitable temperature before passing the mud composition mixture. The heated $H_2S$-containing gas composition is then in direct contact with the mud composition to convert substantially all $H_2S$ in the gas composition to metal sulfides.

In some embodiments, exhaustion of the capacity of the mud composition in the mud composition mixture to absorb and convert hydrogen sulfide to metal sulfides may be detected in any convenient manner and to form an exhausted reaction mixture containing metal sulfides. In some further preferred embodiments, the exhausted reaction mixture then is replenished with the mud composition mixture, or by the addition of the mud composition. Metal sulfides may be removed from the exhausted reaction mixture through the outlets at the bottom of the reactor.

Figure 12:
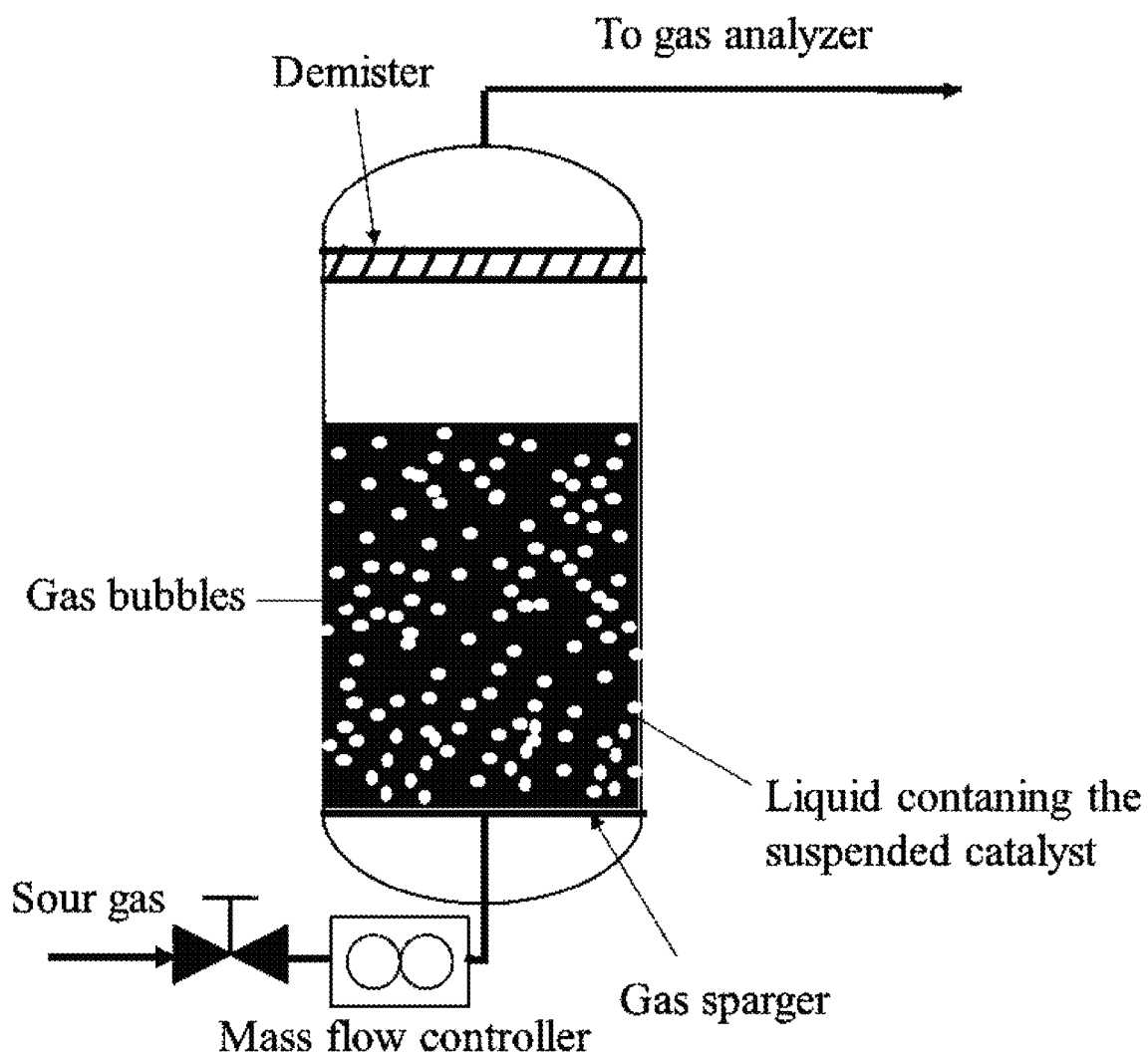
FIG. 12 illustrates a bubble column reactor, according to certain embodiments.

In a most preferred embodiment, the reactor is a bubble column reactor. A general depiction of such is shown in FIG. 12. The method of using the bubble column reactor includes dispersing particles of a mud composition in a reactor, i.e., the mud composition is placed in the column. In a preferred embodiment, only the mud composition is in the column and no other materials or liquids are inside of the column.

At step 104, the method 100 includes dispersing the mud composition in the liquid to form a mud composition mixture. In an alternative embodiment, the reactor is a bubble column reactor and the method includes dispersing particles of a mud composition in a reactor, i.e., the mud composition is placed in the column without any further liquid.

In general drilling fluid, also known as drilling mud, is used to aid the drilling of boreholes into the earth. Drilling mud is a heavy, viscous fluid mixture that is used to carry rock cuttings to the surface and also to lubricate and cool the drill bit. Used while drilling oil and natural gas wells and on exploration drilling rigs, drilling fluids are also used for much simpler boreholes, such as water wells. During the process of drilling corrosive hydrogen sulfide may be encountered. Therefore, a hydrogen sulfide scavenger may be added to the drilling mud to improve the performance and capabilities. As used herein the base mud is a drilling fluid composition without the addition of a hydrogen sulfide scavenger, and the mud composition includes a hydrogen sulfide scavenger.

The water-based drilling mud contains a clay, such as bentonite, to give it enough viscosity to carry cutting chips to the surface, as well as a mineral such as barite (barium sulfate) to increase the weight of the column enough to stabilize the borehole. Smaller quantities of other ingredients might be added, such as caustic soda (sodium hydroxide) to increase alkalinity and decrease corrosion, salts such as potassium chloride to reduce infiltration of water from the drilling fluid into the rock formation, and various petroleum-derived drilling lubricants.

The base mud of the present disclosure includes water, bentonite, xanthan gum, starch, potassium hydroxide, and calcium carbonate. In some embodiments, the base mud contains 40-80 g bentonite, preferably 45-75 g, 50-70 g, or 55-65 g bentonite, 0.1-1 g xanthan gum, preferably 0.2-0.9 g, 0.3-0.8 g, 0.4-0.7 g, or 0.5-0.6 g xanthan gum, 10-30 g starch, preferably 15-25 g, or about 20 g starch, 1-5 g potassium hydroxide, preferably 2-4 g, or about 3 g potassium hydroxide, and 50-100 g calcium carbonate, preferably 60-90 g, or about 70-80 g calcium carbonate, per liter of the water.

In a preferred embodiment, the addition of the hydrogen sulfide scavenger does not change by more than ±10%, preferably ±5%, or ±1% the properties of the base mud. Such properties include but are not limited to apparent viscosity, yield point, plastic viscosity, and gel strength. In some embodiments, the mud composition has an apparent viscosity within 5% or ±1% of the base mud alone. In other words, the base mud remains effective as a drilling mud but has the added capability of scavenging hydrogen sulfide.

In some embodiments, the mud composition includes a layered hydroxide and a base mud referred to as the first mud composition. In some embodiments, the mud composition includes a layered oxide and a base mud, referred to as the second mud composition.

In some embodiments, the mud composition contains 0.1-5 wt. % of the hydrogen sulfide scavenger, preferably 0.25-4 wt. %, 1-3 wt. %, or 1.5-2.5 wt. %, based on a total weight of the mud composition. In some embodiments, the first mud composition contains 0.1-5 wt. % of the CuMnFe LTH, based on a total weight of the mud composition. In some embodiments, the second mud composition contains 0.1-5 wt. % of the CuMnAl LTO, based on a total weight of the mud composition.

Layered hydroxides are a class of ionic solids characterized by a layered structure with the generic layer sequence $[AcBZAcB]_n$, where c represents layers of metal cations, A and B are layers of hydroxide ($HO^-$) anions, and Z are layers of other anions and neutral molecules (such as water). Lateral offsets between the layers may result in longer repeating periods. Layered hydroxides can be seen as derived from hydroxides of divalent cations with the brucite layer structure $[AdBAdB]_n$, by oxidation or cation replacement in the metal layers (d), so as to give them an excess positive electric charge; and intercalation of extra anion layers (Z) between the hydroxide layers (A,B) to neutralize that charge, resulting in the structure $[AcBZAcB]_n$. Layered hydroxides may be formed with a wide variety of anions in the intercalated layers (Z), such as dodecyl sulfate (DDS) ($CH_3(CH_2)_{11}OSO_3^-$), $Cl^-$, $Br^-$, nitrate ($NO_3^-$), carbonate ($CO_3^{2-}$), $SO_4^{2-}$, acetate ($C_2H_3O_2^-$), $SeO_4^{2-}$, and combinations thereof. The size and properties of the intercalated anions may have an effect on the spacing of the layers, known as the basal spacing.

A layered hydroxide may be a synthetic or a naturally occurring layered hydroxide. Naturally-occurring layered hydroxides include those in the Hydrotalcite Group (hydrotalcite, pyroaurite, stichtite, meixnerite, iowaite, droninoite, woodallite, desautelsite, takovite, reevesite, or jamborite), the Quintinite Group (quintinite, charmarite, caresite, zaccagnaite, chlormagaluminite, or comblainite), the Fougerite group (fougerite, trbeurdenite, or mossbauerite), the Woodwardite Group (woodwardite, zincowoodwardite, or honessite), the Glaucocerinite Group (glaucocerinite, hydrowoodwardite, carrboydite, hydrohonessite, mountkeithite, or zincaluminite), the Wermlandite Group (wermlandite, shigaite, nikischerite, motukoreaite, natroglaucocerinite, or karchevskyite), the Cualstibite Group (cualstibite, zincalstibite, or omsite), the Hydrocalumite Group (hydrocalumite or kuzelite), or may be an unclassified layered hydroxide, such as coalingite, brugnatellite, or muskoxite.

In preferred embodiments, the layered hydroxide has a positive layer (c) which contains both divalent and trivalent cations. In an embodiment, the divalent ion is at least one selected from the group consisting of $M^{2+}$ is $Ca^{2+}$, $Mg^{2+}$, $Mn^{2+}$, $Fe^{2+}$, $Cu^{2+}$, $Ni^{2+}$, $Cu^{2+}$, and $Zn^{2+}$. In an embodiment, the trivalent ion is at least one selected from the group consisting of $N^{3+}$ is $Al^{3+}$, $Mn^{3+}$, $Cr^{3+}$, $Fe^{3+}$, $Sc^{3+}$, $Ga^{3+}$, $La^{3+}$, $V^{3+}$, $Sb^{3+}$, $Y^{3+}$, $In^{3+}$, $Co^{3+}$ and/or $Ni^{3+}$. In a preferred embodiment, the layered hydroxide is a layered triple hydroxide (LTH) which contains two divalent cations and one trivalent cation. In a most preferred embodiment, the LTH is a CuMnAl LTH or a CuMnFe LTH.

In an embodiment, the CuMnAl LTH or CuMnFe LTH has a molar ratio of Cu to Mn to Al or Fe of 1-10 to 1-10 to 1-10, preferably a ratio of Cu is 1, 2, 3, 4, 5, 6, 7, 8, 9 or 10, a ratio of Mn is 1, 2, 3, 4, 5, 6, 7, 8, 9 or 10, and a ratio of Al or Fe is 1, 2, 3, 4, 5, 6, 7, 8, 9 or 10. In some embodiments, the CuMnAl LTH or the CuMnFe LTH. has a molar ratio of Cu to Mn to Al or Fe of 1 to 2 to 1.

In an embodiment, the layered hydroxide component may have a particulate form, for example in the form of spheres, granules, whiskers, sheets, flakes, plates, foils, fibers, and the like. In some embodiments, the layered hydroxide includes particles having an average size of 10-70 nm, or preferably 15-65 nm, preferably 20-60 nm, preferably 25-55 nm, preferably 30-50 nm, preferably 35-45 nm. In some embodiments, the layered hydroxide particles are in the form of plates, or nanoplatelets due to their small size. The nanoplatelets may be substantially round or oval shaped nanoplatelets or, alternatively, the nanoplatelets may be polygonal nanoplatelets, such as triangular, square, rectangular, pentagonal, hexagonal, star-shaped, and the like. In an embodiment, the layered hydroxide particles are in the form of hexagonal nanoplatelets with particle sizes stated above. Such nanoplatelets may have a thickness of less than 10 nm, preferably less than 8 nm, preferably less than 6 nm, preferably less than 4 nm. In an embodiment, the layered hydroxide has a basal spacing of 0.5 to 10 nm, preferably 1 to 9 nm, 2 to 8 nm, 3 to 7 nm, 4 to 6 nm or 4.5 to 5.5 nm.

In some embodiments, the layered hydroxide can be calcined to remove the water present between the layers. The removal of the water creates voids between the layers which allows for further integration with the hydrogen sulfide and improved performance as will be described later. In some embodiments, the calcination is at a temperature of 300-500° C., 350-450° C., or about 400° C. for 2-8 hours, preferably 3-7 hours, 4-6 hours, or about 5 hours. In a preferred embodiment, the CuMnAl LTH is calcined to form a CuMnAl LTO.

In an embodiment, the layered oxide component may have a particulate form, for example in the form of spheres, granules, whiskers, sheets, flakes, plates, foils, fibers, and the like. In some embodiments, the layered oxide includes particles having an average size of 10-70 nm, or preferably 15-65 nm, preferably 20-60 nm, preferably 25-55 nm, preferably 30-50 nm, preferably 35-45 nm. In some embodiments, the layered oxide particles are in the form of plates, or nanoplatelets due to their small size. The nanoplatelets may be substantially round or oval shaped nanoplatelets or, alternatively, the nanoplatelets may be polygonal nanoplatelets, such as triangular, square, rectangular, pentagonal, hexagonal, star-shaped, and the like. In an embodiment, the layered oxide particles are in the form of hexagonal nanoplatelets with particle sizes stated above. Such nanoplatelets may have a thickness of less than 10 nm, preferably less than 8 nm, preferably less than 6 nm, preferably less than 4 nm. The LTO may have the same overall morphology and the LTH from which it is formed.

In some embodiments, the LTH or LTO is supported on at least one support selected from) the group consisting of a graphene-based material, an alumina, a carbon nanotube, an activated carbon, a metal organic framework (MOF), and a zeolitic imidazolate framework (ZIF).

A metal organic framework (MOF) is a coordination network with organic ligands containing potential voids. A coordination network is a coordination compound extending, through repeating coordination entities, in one dimension, but with cross-links between two or more individual chains, loops, or spiro-links, or a coordination compound extending through repeating coordination entities in two or three dimensions; and finally a coordination polymer is a coordination compound with repeating coordination entities extending in one, two, or three dimensions. A coordination entity is an ion or neutral molecule that is composed of a central atom, usually that of a metal, to which is attached a surrounding array of atoms or groups of atoms, each of which is called ligands. More succinctly, a metal organic framework is characterized by metal ions or clusters coordinated to organic ligands to form one-, two-, or three-dimensional structures. Typically, a MOF exhibits a regular void or pore structure. The nature of the void or pore structure, including properties or structural factors such as the geometry about the metal ions or clusters, the arrangement of the linkages between metal ions or clusters, and the number, identity, and spatial arrangement of voids or pores. These properties may be described as the structure of the repeat units and the nature of the arrangement of the repeat units. The specific structure of the MOF, which may include the void or pore structure is typically referred to as the MOF topology.

The metal-organic framework comprises a metal ion which is an ion of at least one metal selected from the group consisting of a transition metal (e.g. Sc, Ti, V, Cr, Mn, Fe, Co, Ni, Cu, Y, Zr, Nb, Mo, Tc, Ru, Rh, Pd, Ag, Hf, Ta, W, Re, Os, Ir, Pt, Au, Rf, Db, Sg, Bh, Hs, Mt, Ds, Rg, and Cn), a post-transition metal (e.g. Al, In, Ga, Sn, Bi, Pb, Tl, Zn, Cd, and Hg), and an alkaline earth metal (e.g. Be, Mg, Ca, Sr, Ba, and Ra). Further, these metal ions may be of any oxidation state $M^{+1}$, $M^{+2}$, $M^{+3}$, etc. In one or more embodiments, the metal ion is an ion of at least one metal selected from the group consisting of Zn, Cu, Fe, Ni, Co, Mn, Cr, Cd, Mg, Ca, and Zr.

In the formation of a metal organic framework, the organic ligands must meet certain requirements to form coordination bonds, primarily being multi-dentate, having at least two donor atoms (i.e., N—, and/or O—) and being neutral or anionic. The structure of the metal organic framework is also affected by the shape, length, and functional groups present in the organic linker. In certain embodiments, the metal organic framework of the present disclosure comprises anionic ligands as organic ligands. In one or more embodiments, the organic ligands may have at least two nitrogen donor atoms. For example, the organic ligands may be imidazolate-based, imidazole-derived or ligands similar to an imidazole including, but not limited to, optionally substituted imidazoles, optionally substituted benzimidazoles, optionally substituted imidazolines, optionally substituted pyrazoles, optionally substituted thiazoles, and optionally substituted triazoles. In a preferred embodiment, the metal organic framework of the present disclosure in any of its embodiments comprises 2-methylimidazole and 5-methylbenzimidazole as the organic ligands. 2-Methylimidazole and 5-methylbenzimidazole organic ligands have free nitrogen atoms that may each form a coordinative bond to the metal ions (e.g. Zn(II)) to produce a coordination network. In one or more embodiments, the ligand may be an imidazole of formula (I) or a benzimidazole of formula (II):

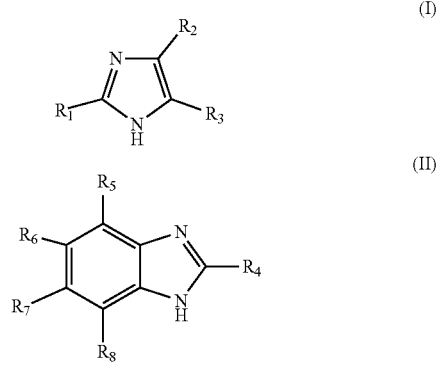

wherein $R_1$, $R_2$, $R_3$, $R_4$, $R_5$, $R_6$, $R_7$, and $R_8$ are each independently selected from the group consisting of a hydrogen, an optionally substituted alkyl, an optionally substituted cycloalkyl, an optionally substituted alkoxy, a hydroxyl, a halogen, a nitro, and a cyano. Preferably, $R_1$, $R_2$, $R_3$, $R_4$, $R_5$, $R_6$, $R_7$, and $R_8$ are each independently a hydrogen, an optionally substituted $C_1$-$C_3$ alkyl group, or an optionally substituted $C_3$-$C_6$ cycloalkyl group. More preferably, $R_1$, $R_2$, $R_3$, $R_4$, $R_5$, $R_6$, $R_7$, and $R_8$ are each independently a hydrogen or a methyl.

Exemplary imidazole-based ligands that may be applicable to the current disclosure include, but are not limited to, imidazole, 2-methylimidazole, 4-methylimidazole, 2-ethylimidazole, 2-isopropylimidazole, 4-tert-butyl-1H-imidazole, 2-ethyl-4-methylimidazole, 2-bromo-1H-imidazole, 4-bromo-1H-imidazole, 2-chloro-1H-imidazole, 2-iodoimidazole, 2-nitroimidazole, 4-nitroimidazole, (1H-imidazol-2-yl) methanol, 4-(hydroxymethyl) imidazole, 2-aminoimidazole, 4-(trifluoromethyl)-1H-imidazole, 4-cyanoimidazole, 3H-imidazole-4-carboxylic acid, 4-imidazolecarboxylic acid, imidazole-2-carboxylic acid, 2-hydroxy-1H-imidazole-4-carboxylic acid, 4,5-imidazoledicarboxylic acid, 5-iodo-2-methyl-1H-imidazole, 2-methyl-4-nitroimidazole, 2-(aminomethyl) imidazole, 4,5-dicyanoimidazole, 4-imidazoleacetic acid, 4-methyl-5-imidazolemethanol, 1-(4-methyl-1H-imidazol-5-yl) methanamine, 4-imidazoleacrylic acid, 5-bromo-2-propyl-1H-imidazole, ethyl-(1H-imidazol-2-ylmethyl)-amine, and 2-butyl-5-hydroxymethylimidazole.

Exemplary benzimidazole-based ligands that may be applicable to the current disclosure include, but are not limited to, benzimidazole, 5-methylbenzimidazole, 2-methylbenzimidazole, 5-chlorobenzimidazole, 5-bromobenzimidazole, 5,6-dimethylbenzimidazole, 5-methoxybenzimidazole, 2-chlorobenzimidazole, 2-bromo-1H-benzimidazole, 6-bromo-1H-benzimidazole, 5-fluoro-1H-benzimidazole, 5-chloro-2-methylbenzimidazole, methyl benzimidazole-2-acetate, 1H-benzoimidazol-4-ol, 1H-benzimidazol-5-yl-methanol, 2-benzimidazolemethanol, 4-chloro-6-(trifluoromethyl)benzimidazole, 5-chloro-2-(trichloromethyl)benzimidazole, 5-cyanobenzimidazole, (2-benzimidazolyl) acetonitrile, (5-chloro-1H-benzimidazol-2-yl) methanol, 2-(chloromethyl)benzimidazole, 5-iodo-2-methylbenzimidazole, (5-chloro-1H-benzimidazol-2-yl)methylamine, 2-(aminomethyl)benzimidazole, 2-(6-chloro-1H-benzimidazol-2-yl) ethanol, 2-(1H-benzoimidazol-2-yl)-acetamide, (6-methoxy-1H-benzimidazol-2-yl) methanol, 5,6-dimethoxybenzimidazole, 2-(1H-benzoimidazol-2-yl)-ethylamine, 1-(5-methyl-1H-benzimidazol-2-yl) methanamine, 1-(5-methyl-1H-benzimidazol-2-yl) ethanamine, 2-benzimidazolepropionic acid, 2-(5-methyl-1H-benzimidazol-2-yl) ethanamine, 2-(3-hydroxy-N-propyl)-5-(trifluoromethyl)-benzimidazole, and N-methyl-1-(5-methyl-1H-benzimidazol-2-yl) methanamine.

Metal organic frameworks comprising such imidazole or benzimidazole ligands are typically referred to as zeolitic imidazolate frameworks (ZIFs). In some embodiments, the metal organic framework is a zeolitic imidazolate framework. Examples of suitable metal organic frameworks include, but are not limited to isoreticular metal organic framework-3 (IRMOF-3), MOF-69A, MOF-69B, MOF-69C, MOF-70, MOF-71, MOF-73, MOF-74, MOF-75, MOF-76, MOF-77, MOF-78, MOF-79, MOF-80, DMOF-1-NH2, UMCM-1-NH2, MOF-69-80, ZIF-1, ZIF-2, ZIF-3, ZIF-4, ZIF-5, ZIF-6, ZIF-7, ZIF-8, ZIF-9, ZIF-10, ZIF-11, ZIF-12, ZIF-14, ZIF-20, ZIF-21, ZIF-22, ZIF-23, ZIF-25, ZIF-60, ZIF-61, ZIF-62, ZIF-63, ZIF-64, ZIF-65, ZIF-66, ZIF-67, ZIF-68, ZIF-69, ZIF-70, ZIF-71, ZIF-72, ZIF-73, ZIF-74, ZIF-75, ZIF-76, ZIF-77, ZIF-78, ZIF-79, ZIF-80, ZIF-81, ZIF-82, ZIF-90, ZIF-91, ZIF-92, ZIF-93, ZIF-94, ZIF-96, ZIF-97, ZIF-100, ZIF-108, ZIF-303, ZIF-360, ZIF- 365, ZIF-376, ZIF-386, ZIF-408, ZIF-410, ZIF-412, ZIF-413, ZIF-414, ZIF-486, ZIF-516, ZIF-586, ZIF-615, and ZIF-725.

In general, the carbon nanomaterial may be any suitable carbon nanomaterial known to one of ordinary skill in the art. Examples of carbon nanomaterials include carbon nanotubes, carbon nanobuds, carbon nanoscrolls, carbon dots, activated carbon, carbon black, graphene, graphene oxide, reduced graphene oxide, and nanodiamonds. In some embodiments, the carbon nanomaterial is at least one selected from the group consisting of graphene, graphene oxide, reduced graphene oxide, carbon nanotubes, carbon dots, and activated carbon.

In some embodiments, the carbon nanomaterial is carbon nanotubes. The carbon nanotubes may, in general, be any suitable carbon nanotubes known to one of ordinary skill in the art. Carbon nanotubes may be classified by structural properties such as the number of walls or the geometric configuration of the atoms that make up the nanotube. Classified by their number of walls, the carbon nanotubes can be single-walled carbon nanotubes (SWCNT) which have only one layer of carbon atoms arranged into a tube, or multi-walled carbon nanotubes (MWCNT), which have more than one single-layer tube of carbon atoms arranged so as to be nested, one tube inside another, each tube sharing a common orientation. Closely related to MWNTs are carbon nanoscrolls. Carbon nanoscrolls are structures similar in shape to a MWCNT, but made of a single layer of carbon atoms that has been rolled onto itself to form a multi-layered tube with a free outer edge on the exterior of the nanoscroll and a free inner edge on the interior of the scroll and open ends. The end-on view of a carbon nanoscroll has a spiral-like shape. For the purposes of this disclosure, carbon nanoscrolls are considered a type of MWCNT. Classified by the geometric configuration of the atoms that make up the nanotube, carbon nanotubes can be described by a pair of integer indices n and m. The indices n and m denote the number of unit vectors along two directions in the honeycomb crystal lattice of a single layer of carbon atoms. If m=0, the nanotubes are called zigzag type nanotubes. If n=m, the nanotubes are called armchair type nanotubes. Otherwise, they are called chiral type nanotubes. In some embodiments, the carbon nanotubes are metallic. In other embodiments, the carbon nanotubes are semiconducting. In some embodiments, the carbon nanotubes are SWCNTs. In other embodiments, the carbon nanotubes are MWCNTs. In some embodiments, the carbon nanotubes are carbon nanoscrolls. In some embodiments, the carbon nanotubes are zigzag type nanotubes. In alternative embodiments, the carbon nanotubes are armchair type nanotubes. In other embodiments, the carbon nanotubes are chiral type nanotubes.

In some embodiments, the carbon nanomaterial is graphene. In some embodiments, the carbon nanomaterial is graphene nanosheets. Graphene nanosheets may consist of stacks of graphene sheets, the stacks having an average thickness and a diameter. In some embodiments, the stacks comprise 1 to 60 sheets of graphene, preferably 2 to 55 sheets of graphene, preferably 3 to 50 sheets of graphene.

In some embodiments, the graphene is in the form of graphene particles. The graphene particles may have a spherical shape, or may be shaped like blocks, flakes, ribbons, discs, granules, platelets, angular chunks, rectangular prisms, or some other shape. In some embodiments, the graphene particles may be substantially spherical, meaning that the distance from the graphene particle centroid (center of mass) to anywhere on the graphene outer surface varies by less than 30%, preferably by less than 20%, more preferably by less than 10% of the average distance. In some embodiments, the graphene particles may be in the form of agglomerates.

In some embodiments, the graphene is pristine graphene. Pristine graphene refers to graphene that has not been oxidized or otherwise functionalized. Pristine graphene may be obtained by methods such as exfoliation, chemical vapor deposition synthesis, opening of carbon nanotubes, unrolling of carbon nanoscrolls, and the like. In alternative embodiments, the graphene is functionalized graphene. Functionalized graphene is distinguished from pristine graphene by the presence of functional groups on the surface or edge of the graphene that contain elements other than carbon and hydrogen. In other alternative embodiments, the graphene is graphene oxide. Graphene oxide refers to graphene that has various oxygen-containing functionalities that are not present in pristine graphene. Examples of such oxygen-containing functionalities include epoxides, carbonyl, carboxyl, and hydroxyl functional groups. Graphene oxide is sometimes considered to be a type of functionalized graphene.

In other alternative embodiments, the graphene is reduced graphene oxide. Reduced graphene oxide (rGO) refers to graphene oxide that has been chemically reduced. It is distinct from graphene oxide in it contains substantially fewer oxygen-containing functionalities compared to graphene oxide, and it is distinct from pristine graphene by the presence of oxygen-containing functionalities and structural defects in the carbon network. Reduced graphene oxide is sometimes considered to be a type of functionalized graphene. In preferred embodiments, the carbon nanomaterial is reduced graphene oxide. The reduced graphene oxide may exist as nanosheets, particles having a spherical shape, or may be shaped like blocks, flakes, ribbons, discs, granules, platelets, angular chunks, rectangular prisms, or some other shape as described above, agglomerates as described above, or any other shape known to one of ordinary skill in the art.

In some embodiments, the carbon nanomaterial is activated carbon. Activated carbon refers to a form of porous carbon having a semi-crystalline, semi-graphitic structure and a large surface area. Activated carbon may be in the form of particles or particulate aggregates having micropores and/or mesopores. Activated carbon typically has a surface area of approximately 500 to 5000 $m^2/g$. The activated carbon particles may have a spherical shape, or may be shaped like sheets, blocks, flakes, ribbons, discs, granules, platelets, angular chunks, rectangular prisms, or some other shape. In some embodiments, the activated carbon particles may be substantially spherical, meaning that the distance from the activated carbon particle centroid (center of mass) to anywhere on the activated carbon particle outer surface varies by less than 30%, preferably by less than 20%, more preferably by less than 10% of the average distance.

In some embodiments, the carbon nanomaterial is carbon black. Carbon black refers to having a semi-crystalline, semi-graphitic structure and a large surface area. Carbon black may be distinguished from activated carbon by a comparatively lower surface area, typically 15 to 500 $m^2/g$ for carbon black. Additionally, carbon black may lack the requisite micropores and mesopores of activated carbon. The carbon black particles may have a spherical shape, or may be shaped like sheets, blocks, flakes, ribbons, discs, granules, platelets, angular chunks, rectangular prisms, or some other shape.

In some embodiments, the particles of a carbon nanomaterial are a single type of particle as described above. In this context, "a single type of particle" may refer to particles of a single carbon nanomaterial, particles which have substantially the same shape, particles which have substantially the same size, or any combination of these. In alternative embodiments, mixtures of types of particles are used.

As used herein, the term "zeolitic," "zeolite," "zeolitic materials," and similar terms generally refer to a material having the crystalline structure or three-dimensional framework of, but not necessarily the elemental composition of, a zeolite. Zeolites are porous silicate or aluminosilicate minerals that occur in nature. Elementary building units of zeolites are $SiO_4$ (and if appropriate, $AlO_4$) tetrahedra. Adjacent tetrahedra are linked at their corners via a common oxygen atom, which results in an inorganic macromolecule with a three-dimensional framework (frequently referred to as the zeolite framework). The three-dimensional framework of a zeolite also comprises channels, channel intersections, and/or cages having dimensions in the range of 0.1-10 nm, preferably 0.2-5 nm, more preferably 0.2-2 nm. Water molecules may be present inside these channels, channel intersections, and/or cages. Zeolites which are devoid of aluminum may be referred to as "all-silica zeolites" or "aluminum-free zeolites". Some zeolites which are substantially free of, but not devoid of, aluminum are referred to as "high-silica zeolites". Sometimes, the term "zeolite" is used to refer exclusively to aluminosilicate materials, excluding aluminum-free zeolites or all-silica zeolites.

In some embodiments, the zeolitic material has a three-dimensional framework that is at least one zeolite framework selected from the group consisting of a 4-membered ring zeolite framework, a 6-membered ring zeolite framework, a 10-membered ring zeolite framework, and a 12-membered ring zeolite framework. The zeolite may have a natrolite framework (e.g. gonnardite, natrolite, mesolite, paranatrolite, scolecite, and tetranatrolite), edingtonite framework (e.g. edingtonite and kalborsite), thomsonite framework, analcime framework (e.g. analcime, leucite, pollucite, and wairakite), phillipsite framework (e.g. harmotome), gismondine framework (e.g. amicite, gismondine, garronite, and gobbinsite), chabazite framework (e.g. chabazite-series, herschelite, willhendersonite, and SSZ-13), faujasite framework (e.g. faujasite-series, Linde type X, and Linde type Y), mordenite framework (e.g. maricopaite and mordenite), heulandite framework (e.g. clinoptilolite and heulandite-series), stilbite framework (e.g. barrerite, stellerite, and stilbite-series), brewsterite framework, or cowlesite framework. In some embodiments, the porous silicate and/or aluminosilicate matrix is a zeolitic material having a zeolite framework selected from the group consisting of ZSM-5, ZSM-8, ZSM-11, ZSM-12, ZSM-18, ZSM-23, ZSM-35 and ZSM-39.

In some embodiments, the support is aluminum oxide. In some embodiments, the aluminum oxide is gamma (γ) aluminum oxide. In some embodiments, the aluminum oxide may include, but are not limited to, alpha (α) aluminum oxide and beta (β) aluminum oxide.

In some embodiments, the porous support is present in the form of particles. In general, the porous support particles can be any shape known to one of ordinary skill in the art. Examples of suitable shapes the metal organic framework particles may take include spheres, spheroids, lentoids, ovoids, solid polyhedra such as tetrahedra, cubes, octahedra, icosahedra, dodecahedra, rectangular prisms, triangular prisms (also known as nanotriangles), nanoplatelets, nanodisks, nanotubes, blocks, flakes, discs, granules, angular chunks, and mixtures thereof.

In some embodiments, the porous support particles have uniform shape. Alternatively, the shape may be non-uniform. As used herein, the term "uniform shape" refers to an average consistent shape that differs by no more than 10%, by no more than 5%, by no more than 4%, by no more than 3%, by no more than 2%, by no more than 1% of the distribution of porous support particles having a different shape. As used herein, the term "non-uniform shape" refers to an average consistent shape that differs by more than 10% of the distribution of porous support particles having a different shape. In one embodiment, the shape is uniform and at least 90% of the porous support particles are spherical or substantially circular, and less than 10% are polygonal. In another embodiment, the shape is non-uniform and less than 90% of the porous support particles are spherical or substantially circular, and greater than 10% are polygonal.

In some embodiment, the porous support is in the form of particles having a mean particle size of 100 to 10,000 nm, preferably 125 to 9,500 nm, preferably 150 to 9,000 nm, preferably 175 to 8,500 nm preferably 200 to 8,000 nm, preferably 250 to 7,500 nm. In embodiments where the porous support particles are spherical, the particle size may refer to a particle diameter. In embodiments where the porous support particles are polyhedral, the particle size may refer to the diameter of a circumsphere. In some embodiments, the particle size refers to a mean distance from a particle surface to particle centroid or center of mass. In alternative embodiments, the particle size refers to a maximum distance from a particle surface to a particle centroid or center of mass. In some embodiments where the porous support particles have an anisotropic shape such as nanorods or nanotubes, the particle size may refer to a length of the nanorod or nanotube, a width of the nanorod or nanotube, or an average of the length and width of the nanorod or nanotube. In some embodiments, the particle size refers to the diameter of a sphere having an equivalent volume as the particle.

At step 106, the method 100 includes continuously agitating the mud composition mixture in the reactor. In some embodiments, the reactor may not require stirring or agitation at all, or may be carried out with shearing or agitation no more than 20000, 10000, 5000, 2500, 1000, 500, 400, 300, 200, 100, 50, 25, or 10 Hz, and no less than 5, 10, 25, 50, 100, 200, 300, 400, 500, 1000, 2500, 5000, 10000, or 15000 Hz at a temperature in a range of 5 to 50° C., 10 to 45° C., preferably 15 to 40° C., further preferably 20 to 35° C., and more preferably 25 to 30° C. In some embodiments, the mud composition mixture occupies at least ¹⁄₂₀, ¹⁄₁₀, ³⁄₁₀, ½, ⅔, ⅘, or ⁹⁄₁₀ of the reactor volume. In still yet some other embodiments, the mud composition mixture occupies no more than ¹⁰⁄₁₁, ⁹⁄₁₀, ⅘, ⅔, ½, ³⁄₁₀, or ¹⁄₁₀ of the reactor volume. In an alternative embodiment, in a bubble column reactor the mud composition is not stirred but rather when the gas is introduced to the reactor, the bubbles from the gas agitate the mud composition.

At step 108, the method 100 includes introducing the $H_2S$-containing gas composition to the reactor containing the mud composition mixture under continuous agitation and passing the $H_2S$-containing gas composition through the mud composition mixture. In a preferred embodiment, in a bubble column reactor, the $H_2S$-containing gas composition is introduced through a bottom of the bubble column. This then produces bubbles of the gas composition in the mud composition which then agitates the mud composition. As the gas composition bubbles move through the column and the mud composition, the $H_2S$ gas gets removed.

In some embodiments, the $H_2S$-containing gas composition is natural gas.

In some embodiments, the $H_2S$-containing gas composition further comprises at least one hydrocarbon selected from the group consisting of methane, ethane, ethylene, propylene, propane, butane, butene, butadiene, and/or isobutylene. The hydrocarbon may further or alternatively include dimethyl ether, ethyl methyl ether, neopentane. The hydrocarbon may comprise at least 20, 40, 60, 80, 90, 95, 99.5, or 99.9 wt. % methane, ethane, ethylene, propylene, propane, butane, butene, butadiene, and/or isobutylene, based on a total weight of hydrocarbons. Other ranges are also possible.

In some embodiments, the $H_2S$-containing gas composition may further comprise $CO_2$, and the $CO_2$ may be present in 2, 5, 10, 15, 20, 25, 30, 40, 50, 60, 65, 75, 85, 100, 150, 200, 250-fold the amount, or more, of the $H_2S$ based on moles. The gas composition may further contain $N_2$, CO, Ar, $H_2$, He, $NH_3$, $O_2$, and/or $O_3$, but may exclude any or all of these. Although, other gasses may be present in the gas composition, the mud composition selectively adsorbs the $H_2S$ and does not adsorb any of the other gases.

In some embodiments, the $H_2S$ is present in the gas composition at a concentration in a range of 10 to 200 parts per million by volume (ppmv), preferably 20 to 180 ppmv, preferably 40 to 160 ppmv, further preferably 60 to 140 ppmv, more preferably 80 to 12 ppmv, or even more preferably 100 ppmv, based on a total volume of the gas composition. Other ranges are also possible.

In some embodiments, the $H_2S$-containing gas composition is introduced to the reactor at a rate of from 0.1 to 2.0 milliliters per minute (mL/min) per milligram of the LTH or LTO in the mud composition, preferably 0.5 to 1.8, preferably 0.6 to 1.6, preferably 0.7 to 1.4, preferably 0.8 to 1.2, preferably 0.9 to 1.1, or 1.0 mL/min per milligram of the LTH or LTO. Other ranges are also possible.

In some embodiments, the mud composition mixture is in contact with the $H_2S$-containing gas composition at a temperature in a range of from 15 to 40° C., preferably 20 to 35° C., preferably 25 to 30° C. under a pressure of 0.9 to 1.2 bar, preferable 0.95 to 1.15 bar, preferably 1.0 to 1.1 bar. Other ranges are also possible.

At step 108, the inventive method 100 may be carried out at pHs in the neutral range and/or above 4, though the efficiency of the $H_2S$ removal should be within 90% across the pH range of 2 to 13, 3 to 11, 4 to 10, 5 to 8, or 6 to 7.5. No particular considerations need to be taken regarding pH, and acceptable reaction pHs will generally be at the ambient/natural conditions of water available.

At step 110, the method 100 includes adsorbing the $H_2S$ from the $H_2S$-containing gas composition onto the mud composition to remove the $H_2S$ from the $H_2S$-containing gas composition and form a purified gas composition.

As used herein, the term "breakthrough time" refers to the elapsed time between initial contact of the mud composition mixture with the $H_2S$-containing gas composition and the time at which $H_2S$ is detected in the purified gas composition. In accordance with the present disclosure, the detection limit for $H_2S$ in a gas composition is 0.5 ppm, based on a total weight of the gas composition.

As used herein, the term "saturation time" refers to the time during which the adsorbent is saturated (in equilibrium) with the adsorbate.

As used herein, the term "scavenging capacity," "adsorption capacity", and similar terms generally refer to the amount of adsorbate taken up by the adsorbent per unit mass or per unit volume of the adsorbent. In accordance with the present disclosure, the term refers to the amount of $H_2S$ taken up by the mud composition per gram of the compound.

In some embodiments, the $H_2S$ content in the purified gas composition after adsorbing by the mud composition is no more than 100 ppmv, 80 ppmv, 60 ppmv, 40 ppmv, 20 ppmv, or 10 ppmv, based on a total volume of the purified gas composition for 1 to 10 minutes, preferable 2 to 5 minutes, preferably about 3 minutes of contact with the mud composition at a temperature in a range of from 15 to 40° C., and under a pressure of 0.9 to 1.2 bar. These rates can be increased by a factor of 1.1, 1.2, 1.25, 1.33, 1.4, 1.45, 1.5, 1.6, 1.67, 1.75, 1.85, 2, 2.25, 2.5, 2.75, 3, 3.5, 4, 5, 6, 7.5, or even 10, by increasing the reaction temperature from 25 to 35, 50, 75, 100, 125, 150, 175, 200, 250, 300, 400, 500, 600, 750, or 900° C. Other ranges are also possible.

In some embodiments, the first mud composition including the LTH contains 0.25 wt. % of the CuMnFe LTH, and 10 g of the first mud composition is in contact with the gas composition containing 100 ppmv of $H_2S$ at a rate of 100 mL/min in the reactor, and the first mud composition has a breakthrough time of from 3-5 hours, preferably 3.5-4.5, or about 4 hours and a saturation time of from 12-18 hours, preferably 13-17 hours, or 14-16 hours. The first mud composition has a scavenging capacity of 140-350 mg, preferably 160-330 mg, 180-310 mg, 200-290 mg, 220-270 mg, or 240-260 mg of hydrogen sulfide per gram of CuMnFe LTH in the reactor.

In some embodiments, the second mud composition including the LTO contains 1.0 wt. % of the CuMnAl LTO, and 10 g of the second mud composition is in contact with the gas composition containing 100 ppmv of $H_2S$ at a rate of 100 mL/min in the reactor, and the second mud composition has a breakthrough time of from 15-20 hours, preferably 16-19 hours, or about 17-18 hours and a saturation time of from 45-50 hours, preferably 46-49 hours, or about 47-48 hours. In some embodiments, the second mud composition has a saturation scavenging capacity 140-250 mg of hydrogen sulfide per gram of CuMnAl LTO in the reactor, preferably 160-230 mg/g, 180-210 mg/g or 190-200 mg/g.

The examples below are intended to further illustrate protocols for preparing, characterizing, and using the mud composition and for performing the method described above and are not intended to limit the scope of the claims.

EXAMPLES

The following examples describe and demonstrate a process for removing hydrogen sulfide ($H_2S$) from a $H_2S$-containing gas composition described herein. The examples are provided solely for illustration and are not to be construed as limitations of the present disclosure, as many variations thereof are possible without departing from the spirit and scope of the present disclosure.

Example 1: CuMnFe Layered Triple Hydroxide Preparation

The CuMnFe layered triple hydroxide (LTH) was synthesized by co-precipitation using a hydrothermal method as follows. First, solution A was prepared by dissolving certain amounts of NaOH and $Na_2CO_3$ in 150 mL of distilled water to give 68.98 and 4.31 mM NaOH and $Na_2CO_3$, respectively. In parallel, solution B was prepared by dissolving certain amounts of $Mn(NO_3)_2 \cdot 6H_2O$, $Cu(NO_3)_2 \cdot 6H_2O$, and $Fe(NO_3)_3 \cdot 9H_2O$ in 150 mL of distilled water to give 17.25, 8.62 and 8.62 mM $Cu^{2+}$, $Mn^{2+}$, and $Fe^{3+}$, respectively. The molar ratios of $Mn^{2+}/Cu^{2+}$ and $(Cu^{2+}+Mn^{2+})/Fe^{3+}$ were maintained at 2/1 and 3/1, respectively.

After the preparation of solutions A and B, the two solutions were simultaneously added dropwise to a beaker containing 100 mL of distilled water having an initial pH of 10, while continuously stirring. The pH of the mixture in the beaker was kept at 9.5-11 via controlling the addition rate of solutions A and B. The mixture in the beaker was continuously stirred at room temperature under ambient air during the addition of solutions A and B. The mixture was further stirred for additional 30 minutes after the addition is complete. Then, the produced suspension was transferred into an autoclave reactor and placed in an oven at 150° C. for 24 h. The crude CuMnFe-LTH was then washed several times with distilled water in order to remove impurities. The solid paste was dried overnight at 80° C. to give the purified solid CuMnFe-LTH.

Example 2: CuMnAl Layered Triple Oxide Preparation

The CuMnAl layered triple hydroxide (LTH) was synthesized by co-precipitation using a hydrothermal method as follows. First, solution A was prepared by dissolving certain amounts of NaOH and $Na_2CO_3$ in 150 mL of distilled water to give 446 and 27.9 mM NaOH and $Na_2CO_3$, respectively. In parallel, solution B was prepared by dissolving certain amounts of $Mn(NO_3)_2 \cdot 6H_2O$, $Cu(NO_3)_2 \cdot 6H_2O$, and $Al(NO_3)_3 \cdot 9H_2O$ in 150 mL of distilled water to give 111, 55.8 and 55.8 mM $Cu^{2+}$, $Mn^{2+}$, and $Al^{3+}$, respectively. The molar ratios of $Mn^{2+}/Cu^{2+}$ and $(Cu^{2+}+Mn^{2+})/Al^{3+}$ were maintained at 2/1 and 3/1, respectively.

After the preparation of solutions A and B, the two solutions were simultaneously added dropwise to a beaker containing 100 mL of distilled water having an initial pH of 10, while continuously stirring. The pH of the mixture in the beaker was kept at 9.5-11 via controlling the addition rate of solutions A and B. The mixture in the beaker was continuously stirred at room temperature under ambient air during the addition of solutions A and B. The mixture was further stirred for additional 30 minutes after the addition is complete. Then, the produced suspension was transferred into an autoclave reactor and placed in an oven at 150° C. for 24 h. The crude CuMnAl-LTH was then washed several times with distilled water in order to remove impurities. The solid paste was dried overnight at 80° C. to give the purified solid CuMnAl-LTH. The CuMnAl-LTH was ground into a powder. Then the CuMnAl-LTH was calcined at 500° C. for 3 hours to obtain the CuMnAl-layered triple oxide (LTO).

Example 3: CuMnFe LTH Characterization

Figure 3:
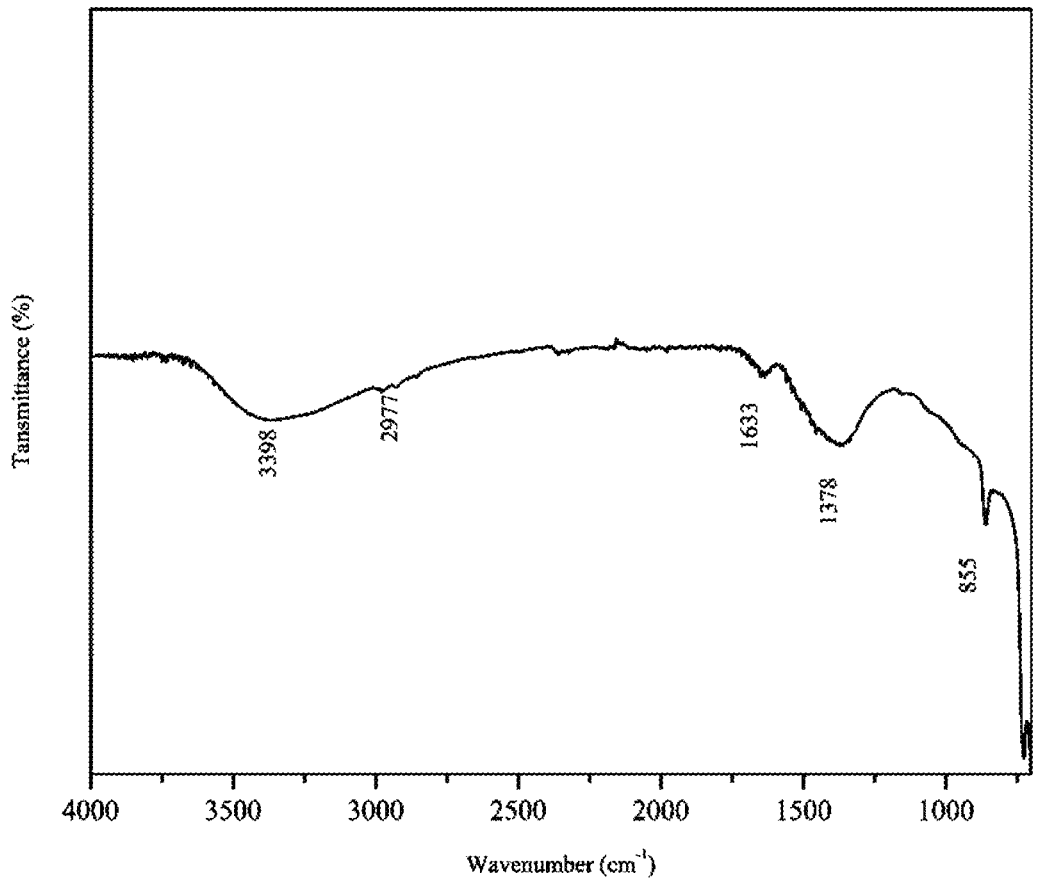
FIG. 3 illustrates a Fourier Transform Infrared (FT-IR) spectrum of the CuMnFe-LTH, according to certain embodiments.

FIG. 3 shows a FT-IR spectrum of the CuMnAl-LTH, confirming the preparation of the LTH.

Figure 4:
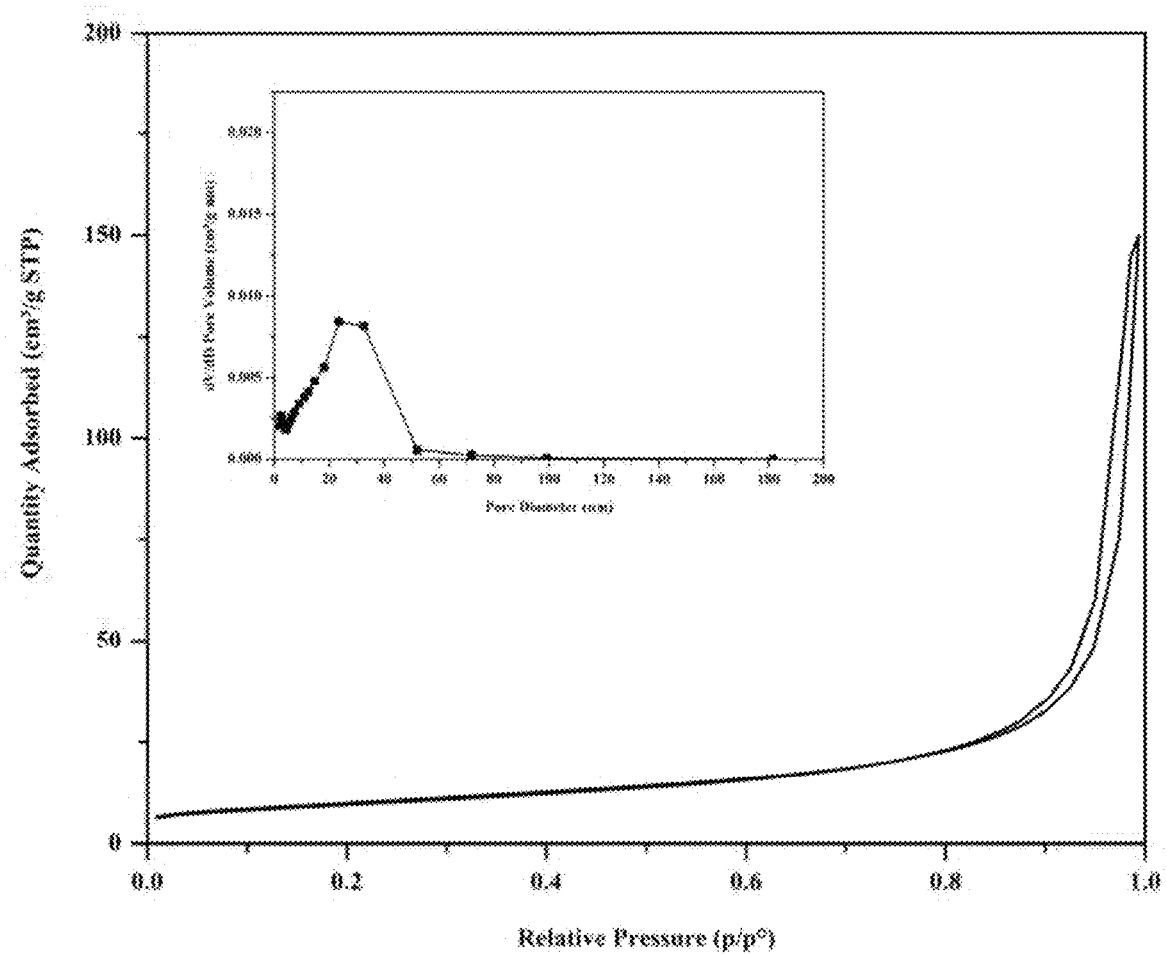
FIG. 4 illustrates isotherms of $N_2$ adsorption and desorption from the CuMnFe-LTH, with an inset of the pore size distribution, according to certain embodiments.

FIG. 4 shows isotherms of $N_2$ adsorption and desorption from the CuMnAl-LTH, indicating the surface area and pore diameter of the CuMnAl-LTH to be from 50-100 $m^2/g$ and 20-40 nm, respectively.

Figure 5:
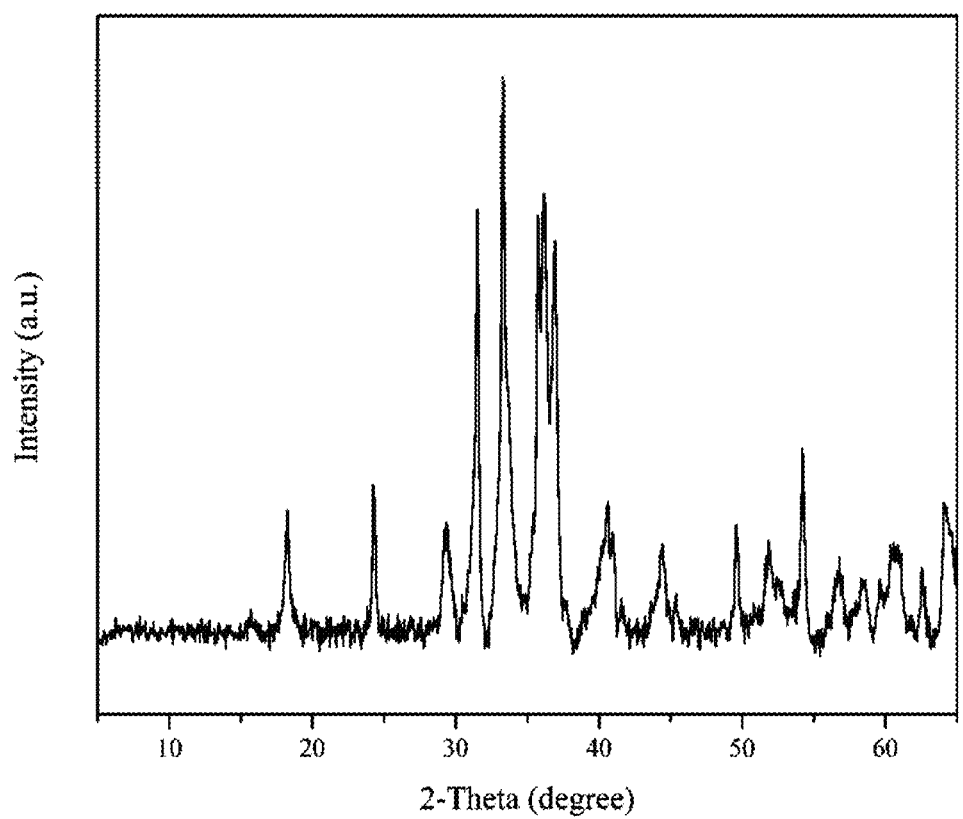
FIG. 5 illustrates an X-ray diffraction (XRD) pattern of the CuMnFe-LTH, according to certain embodiments.

FIG. 5 shows an XRD pattern of the CuMnAl-LTH, indicating the formation of a crystalline material.

Figure 6:
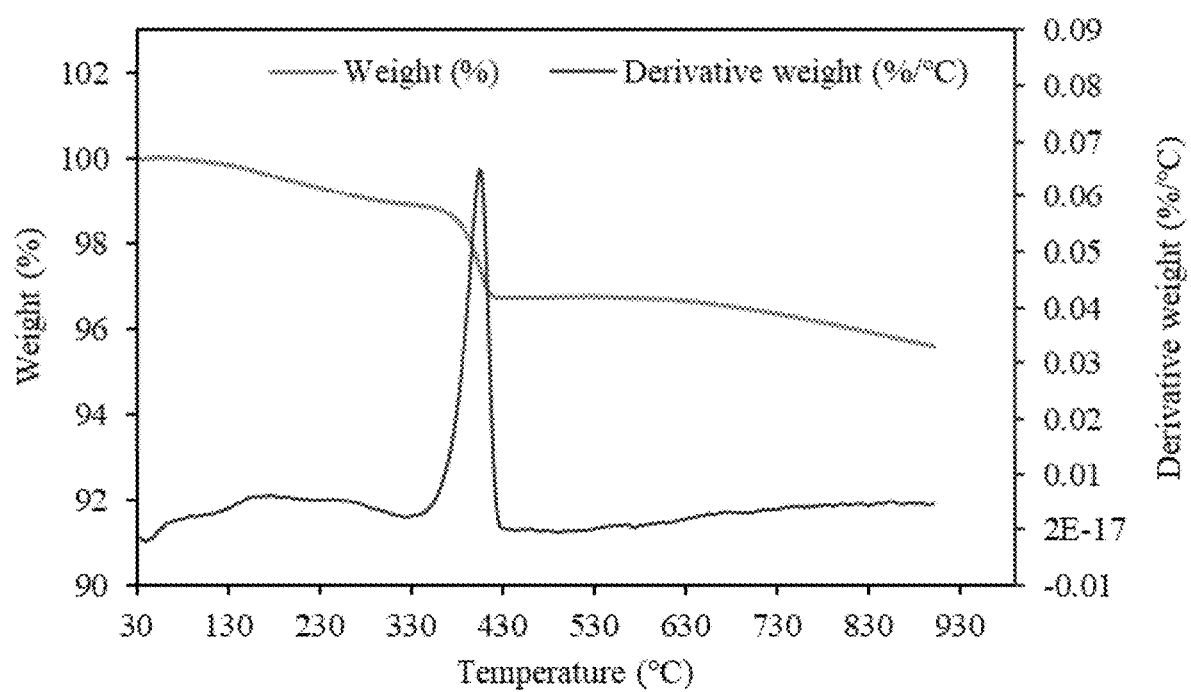
FIG. 6 illustrates a thermogravimetric profile of the CuMnFe-LTH, according to certain embodiments.

FIG. 6 shows a thermogravimetric analysis of the CuMnAl-LTH, indicating a transition at about 400° C.

Example 4: CuMnFe-LTH Performance

The ability of the CuMnFe-LTH to effectively remove hydrogen sulfide from the encountered sour gas during oil/gas wells drilling was studied. In a continuous setup with a bubble column reactor (BCM), flowmeter and $H_2S$ detector, the scavenging capacities at breakthrough (i.e., when $H_2S$ was first detected in the outlet gas stream) and at saturation of the aqueous drilling fluid without the scavenger and aqueous drilling fluid with the added scavenger were determined. The diameter of the BCR was 1 cm while its length was 60 cm the BCR.

The water-based drilling mud (BM) was formulated according to Table 1 and the pH was adjusted between 11-11.50. Each component was chosen for their intrinsic property and advantages to the rheology of the aqueous drilling fluid. The 9.0 ppg scavenger-based drilling mud was formulated with the addition of 0.25 wt. % of CuMnFe-LTH (referred subsequently as LTH-BM). 10.0 g of each formulated drilling fluid was collected into the bubble column for $H_2S$ scavenging capacity measurement. A steady continuous gaseous source of 100 ppmv $H_2S$ (in methane) flowing at 100 mL/min was introduced to the bottom of the BCR. The gas flow within the liquid creates swarms of bubbles, which keep the composition suspended within the liquid in the BCR. The gas exiting the reactor was sent to an $H_2S$ gas detector with a detection limit of 0.5 ppm. The exit gas was monitored and the concentration of $H_2S$ in the treated gas was continuously recorded. The experiments were conducted at ambient conditions (room temperature and atmospheric pressure).

Figure 2:
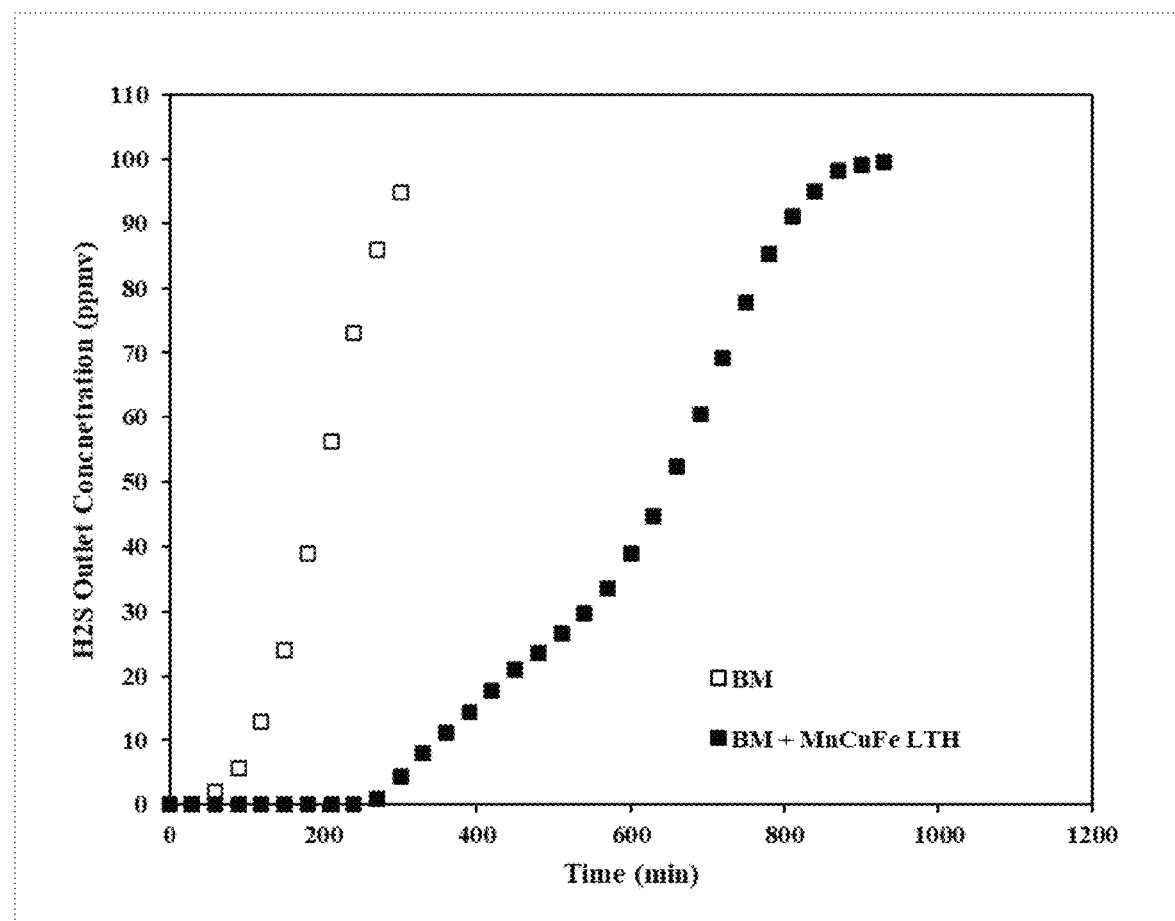
FIG. 2 illustrates a breakthrough curve of base mud (BM) and BM with a CuMnFe-layered triple hydroxide (LTH), according to certain embodiments.

The results of the CuMnFe-LTH scavenging performance are illustrated in FIG. 2 and are summarized in Table 2. These results are compared to the base mud alone without the addition of the CuMnFe-LTH.

TABLE 1

Base drilling mud (BM) composition.

| Additives | Quantities |
|---|---|
| Distilled Water | 350.0 mL |
| Bentonite | 20.0 g |
| Xanthan Gum | 0.2 g |
| Starch | 6.0 g |
| Potassium Hydroxide | 0.5 g |
| Calcium Carbonate | 30.0 g |

TABLE 2

Scavenging performance.

| Drilling fluid | Breakthrough Time (min) | Breakthrough Capacity (mg/L) | Saturation time (min) | Saturation Capacity (mg/L) |
|---|---|---|---|---|
| BM | 34.5 | 52.3 | 325 | 294.6 |
| LTH-BM | 267 | 400 | 934 | 918.5 |
| | | 148.8[a] | | 341.8[a] |

[a] mg $H_2S$/g scavenger

Example 5: CuMnFe-LTH Rheology

The effect of the CuMnFe-LTH on the rheological characteristics of aqueous drilling fluids at varying concentrations was studied. The rheological measurements were conducted using a Model 3600 Grace Viscometer, at a temperature of 120 Fahrenheit and ambient pressure.

The results of the test revealed that the utilization of CuMnFe-LTH does not have any deleterious impacts on the rheological properties of the water-based mud. Notably, the results indicate that the CuMnFe-LTH be employed to enhance the apparent viscosity, yield point, and gel strengths of the aqueous drilling fluids. The results of these tests are presented in Table 3 and Table 4.

TABLE 3

Rheological characteristics

| Scavenger conc. (wt. %) | AV (cP) | YP (lb/100 ft$^2$) | PV (cP) | Carrying capacity YP/PV | GS (10 s) (lb/100 ft$^2$) | GS (10 min) (lb/100 ft$^2$) |
|---|---|---|---|---|---|---|
| | | | | Rheological parameters | | |
| BM | 19.08 | 7.05 | 15.56 | 0.45 | 3.52 | 18.19 |
| LTH-BM | 18.89 | 7.05 | 15.36 | 0.46 | 3.71 | 17.61 |

AV: apparent viscosity;
YP: yield point;
PV: plastic viscosity;
GS: gel strength.

TABLE 4

Rheological characteristics

| Drilling fluid | Fluid loss (mL) | FL Cake Thickness (mm) |
|---|---|---|
| BM | 12.8 | 2.38 |
| LTH-BM | 13.8 | 2.38 |

Example 6: CuMnAl-LTO Characterization

Figure 8:
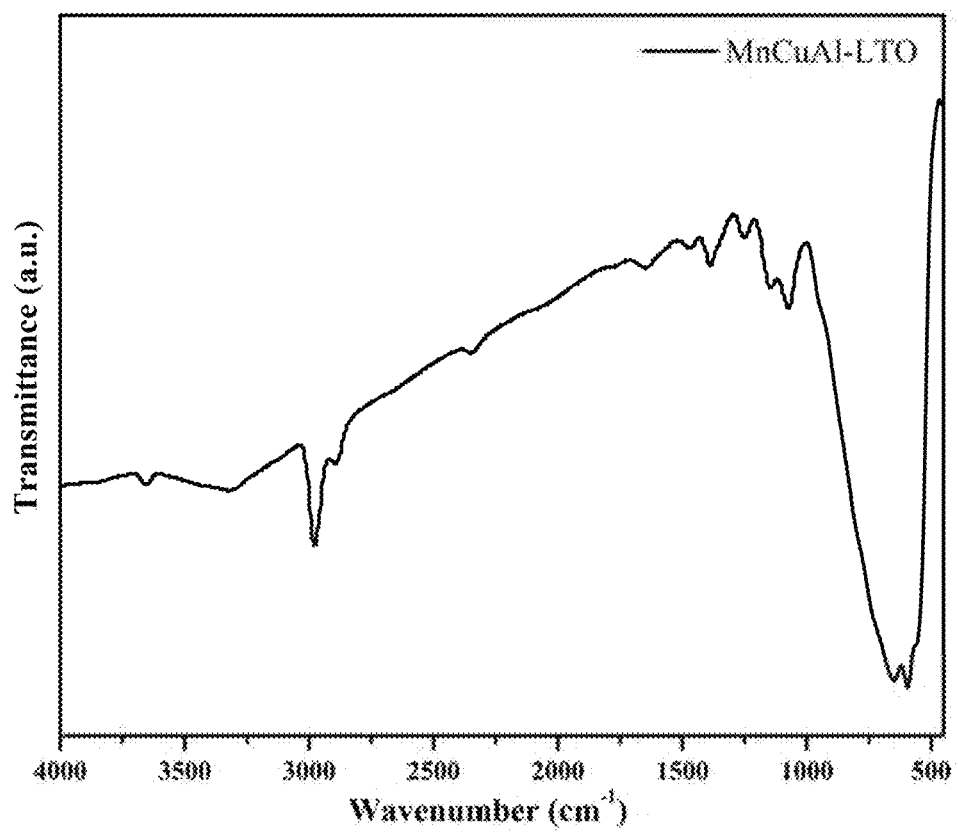
FIG. 8 illustrates a FT-IR spectrum of the CuMnAl-LTO, according to certain embodiments.

FIG. 8 shows a FT-IR spectrum of the CuMnAl-LTO, confirming the preparation of the LTO.

Figure 9:
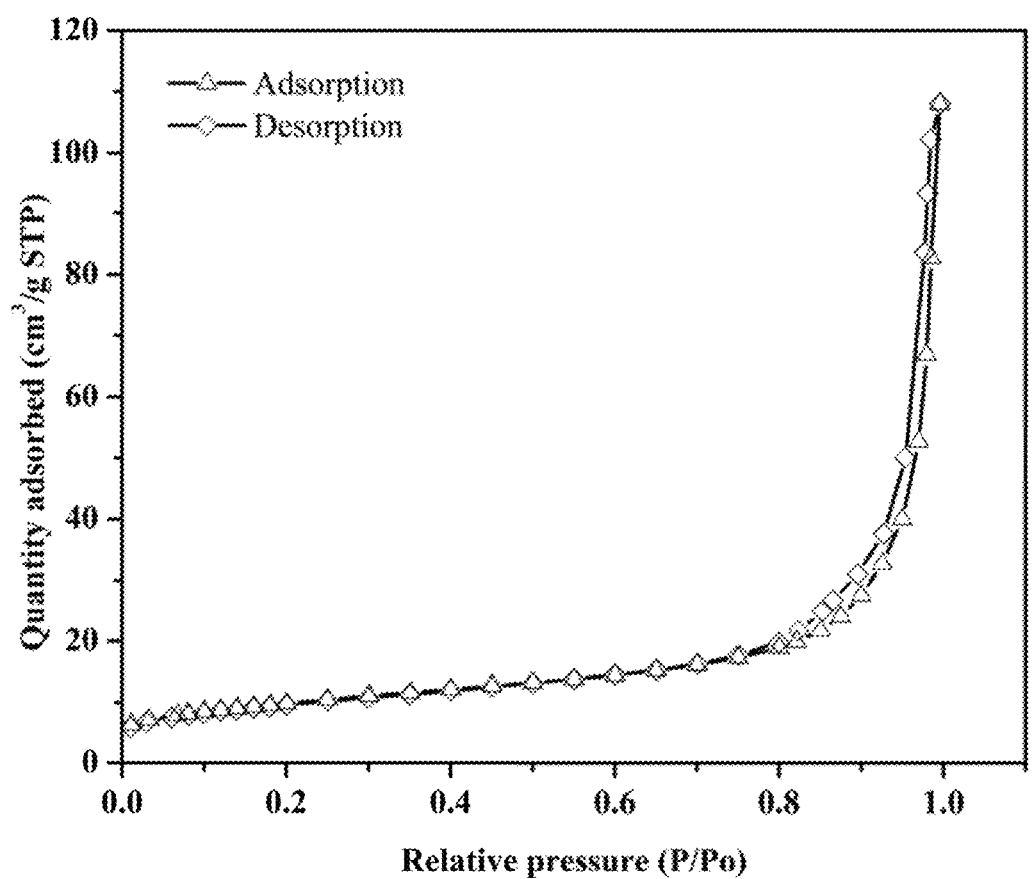
FIG. 9 illustrates isotherms of $N_2$ adsorption and desorption from the CuMnAl-LTO, according to certain embodiments.

FIG. 9 shows isotherms of $N_2$ adsorption and desorption from the CuMnAl-LTO, indicating the surface are of the CuMnAl-LTO to be from 50-100 m$^2$/g.

Figure 10:
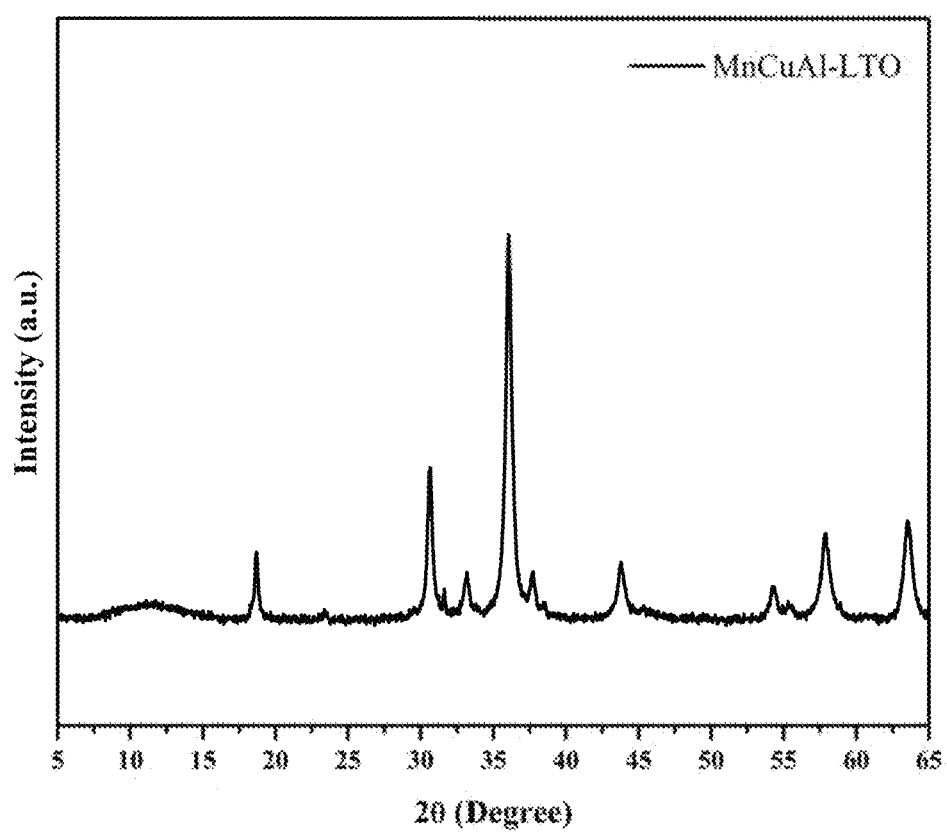
FIG. 10 illustrates an XRD pattern of the CuMnAl-LTO, according to certain embodiments.

FIG. 10 shows an XRD pattern of the CuMnAl-LTO, indicating the formation of a crystalline material.

Figure 11:
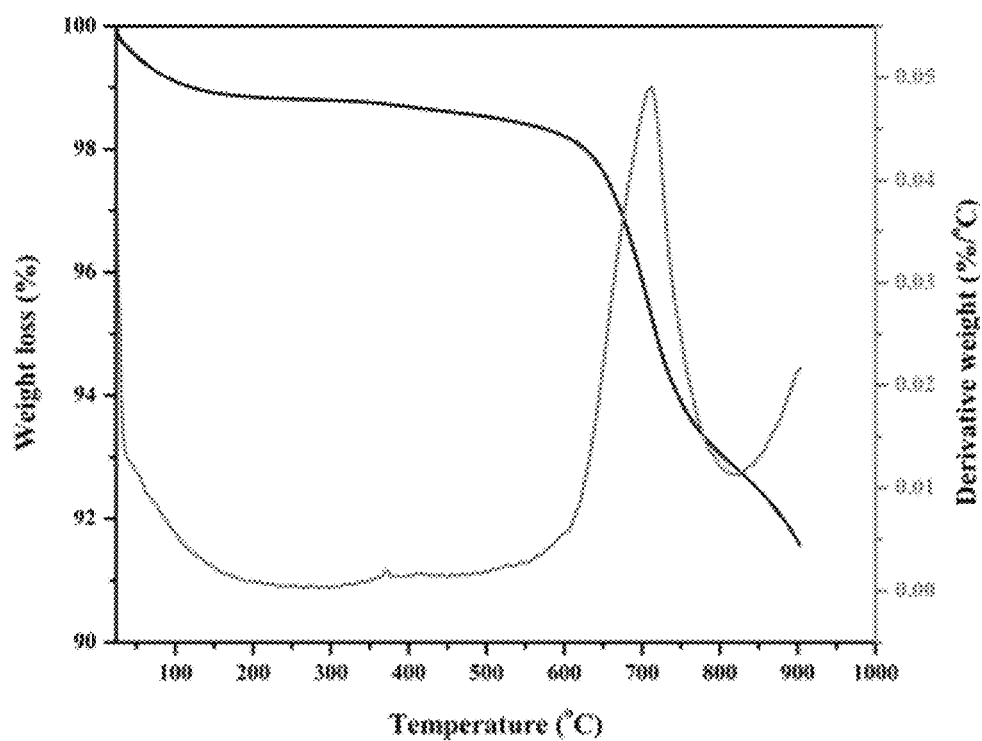
FIG. 11 illustrates a thermogravimetric profile of the CuMnAl-LTO, according to certain embodiments.

FIG. 11 shows a thermogravimetric analysis of the CuMnAl-LTO, indicating a transition at about 700° C.

Example 7: CuMnAl-LTO Performance

The ability of the CuMnAl-LTO to effectively remove hydrogen sulfide from the encountered sour gas during oil/gas wells drilling was studied. In a continuous setup with a bubble column reactor (BCM), flowmeter and $H_2S$ detector, the scavenging capacities at breakthrough (i.e., when $H_2S$ was first detected in the outlet gas stream) and at saturation of the aqueous drilling fluid without the scavenger and aqueous drilling fluid with the added scavenger were determined. The diameter of the BCR was 1 cm while its length was 60 cm the BCR.

The water-based drilling mud (WBM) was formulated according to Table 1 and the pH was adjusted between 11-11.50. Each component was chosen for their intrinsic property and advantages to the rheology of the aqueous drilling fluid. The 9.0 ppg scavenger-based drilling mud was formulated with the addition of 1.0 wt. % of CuMnAl-LTO (referred subsequently as WBM-LTO). 10.0 g of each formulated drilling fluid was collected into the bubble column for $H_2S$ scavenging capacity measurement. A steady continuous gaseous source of 100 ppmv $H_2S$ (in methane) flowing at 100 mL/min was introduced to the bottom of the BCR. The gas flow within the liquid creates swarms of bubbles, which keep the composition suspended within the liquid in the BCR. The gas exiting the reactor was sent to an $H_2S$ gas detector with a detection limit of 0.5 ppm. The exit gas was monitored and the concentration of $H_2S$ in the treated gas was continuously recorded. The experiments were conducted at ambient conditions (room temperature and atmospheric pressure). FIG. 12 depicts an embodiment of a bubble column reactor.

Figure 7:
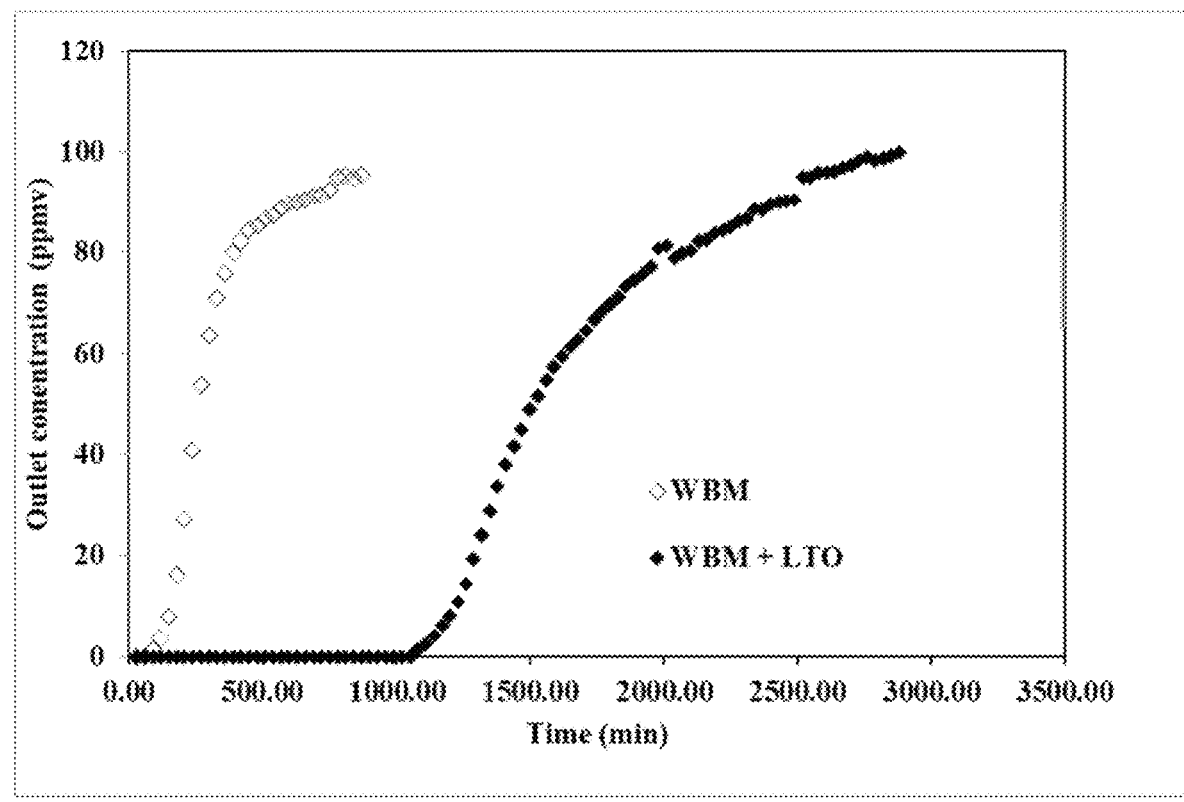
FIG. 7 illustrates a breakthrough curve of water-based mud (WBM) and WBM with a CuMnAl-layered triple oxide (LTO), according to certain embodiments.

The results of the CuMnAl-LTO scavenging performance are illustrated in FIG. 7 and are summarized in Table 5. These results are compared to the base mud alone without the addition of the CuMnAl-LTO.

TABLE 5

Scavenging performance.

| Drilling fluid | Breakthrough Time (min) | Breakthrough Capacity (mg/L) | Saturation time (min) | Saturation Capacity (mg/L) |
|---|---|---|---|---|
| WBM | 69.50 | 104.7 | 891.00 | 478.4 |
| WBM-LTO | 1058.00 | 1582.8 | 2878.50 | 2483.0 |
| | | 147.2$^a$ | | 231.0$^a$ |

$^a$mg $H_2S$/g scavenger

It is also noteworthy to mention that the loading can be adjusted depending on the $H_2S$ concentration in the $H_2S$-containing gas composition as well as the sour gases flow rate. The loading of the LTH or LTO can be high such that it can form a thick reaction slurry (i.e., slurry phase reaction). Additionally, the stirring speed, medium pH, volume, reaction temperature, pressure, and gas inlet flow rate can be adjusted to meet the reactor configurations and design parameters.

Example 8: CuMnAl-LTO Rheology

The effect of the CuMnFe-LTH on the rheological characteristics of aqueous drilling fluids at varying concentrations was studied. The rheological measurements were conducted using a Model 3600 Grace Viscometer, at a temperature of 120 Fahrenheit and ambient pressure.

The results of the test revealed that the utilization of CuMnAl-LTO does not have any deleterious impacts on the rheological properties of the water-based mud. Notably, the results indicate that the CuMnAl-LTO be employed to enhance the apparent viscosity, yield point, and gel strengths of the aqueous drilling fluids. The results of these tests are presented in Table 6 and Table 7.

TABLE 6

Rheological characteristics

| Scavenger conc. (wt. %) | PV (cP) | AV (cP) | YP (lb/100 ft$^2$) | Carrying capacity YP/PV | GS (10 s) (lb/100 ft$^2$) | GS (10 min) (lb/100 ft$^2$) |
|---|---|---|---|---|---|---|
| | | | | Rheological parameters | | |
| WBM | 11.25 | 15.98 | 7.44 | 0.66 | 2.93 | 32.68 |
| 0.25 | 11.64 | 15.77 | 6.26 | 0.54 | 2.15 | 28.18 |
| 0.50 | 12.04 | 15.87 | 5.68 | 0.47 | 1.56 | 23.87 |
| 0.75 | 11.64 | 16.08 | 6.85 | 0.59 | 1.76 | 27.59 |
| 1.00 | 11.84 | 15.77 | 5.87 | 0.50 | 1.95 | 24.26 |

AV: apparent viscosity;
YP: yield point;
PV: plastic viscosity;
GS: gel strength.

TABLE 7

| | Rheological characteristics | |
|---|---|---|
| Drilling fluid | Fluid loss (mL) | FL Cake Thickness (1/32 inch) |
| WBM | 12.0 | 2 |
| WBM-LTO | 12.2 | 3 |

Example 9: Application in Sour Oil Desulfurization

Sour oil can also be treated by the method described in the present disclosure. Firstly, the sour oil is emulsified in water to form an emulsion. Then, the LTH or LTO is mixed and suspended in the emulsion. Additionally, the contact between the sulfur-bearing components of the sour oil in the emulsion and the mud composition promote the desulfurization of sour oil.

Numerous modifications and variations of the present disclosure are possible in light of the above teachings. It is therefore to be understood that within the scope of the appended claims, the invention may be practiced otherwise than as specifically described herein.

The invention claimed is:

1. A method for removing hydrogen sulfide ($H_2S$) from a $H_2S$-containing gas composition, comprising:
   dispersing particles of a mud composition in a reactor;
   introducing the $H_2S$-containing gas composition through a bottom of the reactor containing the mud composition and passing the $H_2S$-containing gas composition through the mud composition; and
   adsorbing and removing $H_2S$ from the gas composition by the mud composition to form a purified gas composition,
   wherein the mud composition comprises:
      a CuMnAl layered triple oxide (LTO); and
      a base mud.

2. The method of claim 1, wherein the CuMnAl LTO has a molar ratio of Cu to Mn to Al of 1-10 to 1-10 to 1-10.

3. The method of claim 1, wherein the mud composition comprises 0.1-5 wt. % of the CuMnAl LTO, based on a total weight of the mud composition.

4. The method of claim 1, wherein the base mud comprises water, bentonite, xanthan gum, starch, potassium hydroxide, and calcium carbonate.

5. The method of claim 4, wherein the base mud comprises 40-80 g bentonite, 0.1-1 g xanthan gum, 10-30 g starch, 1-5 g potassium hydroxide, and 50-100 g calcium carbonate, per liter of the water.

6. The method of claim 1, wherein the mud composition has an apparent viscosity within 5% of the base mud alone.

7. The method of claim 1, wherein the gas composition further comprises at least one of methane, carbon dioxide, and nitrogen, and
   wherein the mud composition selectively adsorbs the $H_2S$.

8. The method of claim 1, wherein the $H_2S$ is present in the gas composition at a concentration in a range of 10 to 200 parts per million by volume (ppmv) based on a total volume of the gas composition.

9. The method of claim 1, wherein the $H_2S$-containing gas composition is introduced to the reactor at a rate of 0.4 to 2.0 milliliters per minute (mL/min) per milligram of the CuMnAl LTO.

10. The method of claim 1, wherein the mud composition comprises 1.0 wt. % of the CuMnAl LTO, based on a total weight of the mud composition,
    wherein the mud composition is in contact with the gas composition comprising 100 ppmv of $H_2S$ at a rate of 100 mL/min in the reactor,
    wherein the mud composition has a breakthrough time of from 15-20 hours, and a saturation time of from 45-50 hours, and
    wherein the mud composition has a scavenging capacity of 140-250 mg of hydrogen sulfide per gram of CuMnAl LTO in the reactor.

11. A method for removing hydrogen sulfide ($H_2S$) from a $H_2S$-containing gas composition, comprising:
    dispersing particles of a mud composition in a reactor;
    introducing the $H_2S$-containing gas composition through a bottom of the reactor containing the mud composition and passing the $H_2S$-containing gas composition through the mud composition; and
    adsorbing and removing $H_2S$ from the gas composition by the mud composition to form a purified gas composition,
    wherein the mud composition comprises:
       a CuMnFe layered triple hydroxide (LTH); and
       a base mud.

12. The method of claim 1, wherein the CuMnFe LTH has a molar ratio of Cu to Mn to Fe of 1-10 to 1-10 to 1-10.

13. The method of claim 1, wherein the mud composition comprises 0.1-5 wt. % of the CuMnFe LTH, based on a total weight of the mud composition.

14. The method of claim 1, wherein the base mud comprises water, bentonite, xanthan gum, starch, potassium hydroxide, and calcium carbonate.

15. The method of claim 14, wherein the base mud comprises 40-80 g bentonite, 0.1-1 g xanthan gum, 10-30 g starch, 1-5 g potassium hydroxide, and 50-100 g calcium carbonate, per liter of the water.

16. The method of claim 1, wherein the mud composition has an apparent viscosity within 5% of the base mud alone.

17. The method of claim 1, wherein the gas composition further comprises at least one of methane, carbon dioxide, and nitrogen, and
    wherein the mud composition selectively adsorbs the $H_2S$.

18. The method of claim 1, wherein the $H_2S$ is present in the gas composition at a concentration in a range of 10 to 200 parts per million by volume (ppmv) based on a total volume of the gas composition.

19. The method of claim 1, wherein the $H_2S$-containing gas composition is introduced to the reactor at a rate of 0.1 to 2.0 milliliters per minute (mL/min) per milligram of the CuMnFe LTH.

20. The method of claim 1, wherein the mud composition comprises 0.25 wt. % of the CuMnFe LTH, based on a total weight of the mud composition,
    wherein the mud composition is in contact with the gas composition comprising 100 ppmv of $H_2S$ at a rate of 100 mL/min in the reactor,
    wherein the mud composition has a breakthrough time of from 3-5 hours, and a saturation time of from 12-18 hours, and
    wherein the mud composition has a scavenging capacity of 140-350 mg of hydrogen sulfide per gram of CuMnFe LTH in the reactor.

* * * * *